United States Patent
Kang et al.

(10) Patent No.: US 7,053,889 B2
(45) Date of Patent: May 30, 2006

(54) CIRCUIT FOR DETECTING ACTIVE VIDEO AREA FOR DISPLAY DEVICE, METHOD FOR DETECTING ACTIVE VIDEO AREA FOR DISPLAY DEVICE AND COORDINATE MAPPING METHOD USING DETECTED ACTIVE VIDEO AREA

(75) Inventors: Suk chan Kang, Seoul (KR); Young kyu Kim, Suwon (KR)

(73) Assignee: Samsung Electronics, Co., Ltd. (KR)

( * ) Notice: Subject to any disclaimer, the term of this patent is extended or adjusted under 35 U.S.C. 154(b) by 423 days.

(21) Appl. No.: 10/426,428

(22) Filed: Apr. 30, 2003

(65) Prior Publication Data

US 2003/0210253 A1     Nov. 13, 2003

(30) Foreign Application Priority Data

May 7, 2002    (KR)  ............... 2002-25136

(51) Int. Cl.
    *G09G 5/00*      (2006.01)
(52) U.S. Cl. ...................... 345/204; 345/213
(58) Field of Classification Search .......... 345/3.1–3.4, 345/99, 204, 213, 530, 545; 348/500, 511, 348/516
See application file for complete search history.

(56) References Cited

U.S. PATENT DOCUMENTS

| | | | | |
|---|---|---|---|---|
| 5,329,211 A | | 7/1994 | Sasaki et al. ............... | 315/371 |
| 5,416,533 A | * | 5/1995 | Kageyama | |
| 5,987,624 A | * | 11/1999 | Eglit | |
| 6,556,191 B1 | * | 4/2003 | Ouchi ......................... | 345/204 |
| 6,683,585 B1 | | 1/2004 | Nakano ....................... | 345/10 |
| 2002/0109669 A1 | * | 8/2002 | Ha | |
| 2004/0061705 A1 | * | 4/2004 | Yoon et al. | |
| 2004/0150648 A1 | * | 8/2004 | Kim et al. | |

FOREIGN PATENT DOCUMENTS

| | | |
|---|---|---|
| JP | 2001-34245 | 2/2001 |
| JP | 2001165981 | 6/2001 |
| JP | 2001290457 | 10/2001 |

\* cited by examiner

*Primary Examiner*—Regina Liang
(74) *Attorney, Agent, or Firm*—Mills & Onello LLP

(57) ABSTRACT

A circuit for detecting an active video area for a display device, a method for detecting an active video area for a display device, and a coordinate mapping method using the detected active video area are provided. The circuit for detecting an active video area for a display device includes a comparison signal generator, a horizontal starting point detecting unit, a horizontal ending point detecting unit, a vertical starting point detecting unit, and a vertical ending point detecting unit. The method for mapping coordinates of a video source to coordinates of a display device includes (a) selecting a predetermined area of the video source, (b) generating a predetermined reference pattern, (c) transmitting R, G, and B signals in which the reference pattern is embedded, to the display device, (d) comparing the R, G, and B signals with a predetermined black level and outputting a comparison signal which indicates the existence of a video signal, (e) detecting a horizontal starting point, a horizontal ending point, a vertical starting point, and a vertical ending point using the comparison signal, and (f) converting the selected predetermined area of the video source into the counterpart area of the display device, using a predetermined mapping relationship and the detected horizontal starting point, the detected horizontal ending point, the detected vertical starting point, and the detected vertical ending point. Coordinates of the video source are thereby mapped to coordinates of the display device.

26 Claims, 19 Drawing Sheets

CIRCUIT FOR DETECTING ACTIVE VIDEO AREA FOR DISPLAY DEVICE, METHOD FOR DETECTING ACTIVE VIDEO AREA FOR DISPLAY DEVICE AND COORDINATE MAPPING METHOD USING DETECTED ACTIVE VIDEO AREA

BACKGROUND OF THE INVENTION

This application claims the priority of Korean Patent Application No. 2002-25136, filed May 7, 2002, which is incorporated herein in its entirety by reference.

1. Field of the Invention

The present invention relates to the field of display devices and video sources, and more particularly, to a method for detecting an active video area for a display device and a method for mapping coordinates between a video source and a display device using the detected active video area.

2. Description of the Related Art

An independent coordinate system is used in a display device and a video source which supplies a video signal to the display device. Thus, it has been only considered that a signal is transmitted from the video source to the display device in one direction.

In conventional systems, since video data is transmitted from the video source to the display device in one direction, a user should select a region directly on the display device when the user wants to perform a predetermined function in that region of the display screen.

For example, assuming the video source is a computer and the display device is a monitor, it is well known that a screen signal is transmitted from a graphic card of a computer to the monitor in one direction. However, a function is required for mapping the predetermined area that is selected from video memory of the graphic card according to a user's demand into its counterpart area on the monitor in terms of the value corresponding to the system clock signal of the monitor. This is because when a user desires to perform a predetermined function in a predetermined region of a monitor screen, the user can readily select an area using a pointing device such as a mouse, in a corresponding position of an operating system (O/S) screen, rather than selecting an area from the monitor.

For example, when functions such as contrast and sharpness are changed only in an area on the monitor screen where a moving picture is played, the user can easily select the area from the O/S screen using the mouse and can therefore readily control related functions. It is therefore unnecessary to form an area selection terminal directly in the monitor.

FIG. 1 illustrates a relationship between a conventional coordinate system for a video source and a conventional coordinate system for a display device. Referring to FIG. 1, X and Y denote x-axis and y-axis coordinates at an arbitrary point in a video source coordinate system, respectively. In addition, X' and Y' denote x-axis and y-axis coordinates that are mapped in a display device coordinate system, respectively.

The relationship between the video source coordinate system and the display device coordinate system is expressed by Equation 1.

$$\begin{bmatrix} X' \\ Y' \end{bmatrix} = \begin{bmatrix} \frac{HE-HS}{HMAX} & 0 \\ 0 & \frac{VE-VS}{VMAX} \end{bmatrix} \begin{bmatrix} X \\ Y \end{bmatrix} + \begin{bmatrix} HS \\ VS \end{bmatrix} \quad (1)$$

In order to map coordinates (X, Y) of the video source to coordinates (X', Y') of the display device by Equation 1, a horizontal starting point HS, a horizontal ending point HE, a vertical starting point VS, and a vertical ending point VE of the display device and a horizontal length HMAX and a vertical length VMAX of the video source coordinate system should be accurately known.

The horizontal starting point HS and the horizontal ending point HE of the display device refer to x-axis starting and ending positions, respectively, of an active video area that is measured as a horizontal clock count H_CKCNT from the starting position of a horizontal synchronous signal HSYNC in the display device coordinate system. The vertical starting point VS and the vertical ending point VE refer to y-axis starting and ending positions, respectively, of the active video area that is measured as a vertical clock count V_CKCNT from the starting position of a vertical synchronous signal VSYNC in the display device coordinate system. The active video area refers to an area of the screen in which the entire video source coordinate system is recognized in the display device coordinate system. Thus, the horizontal starting point HS, the horizontal ending point HE, the vertical starting point VS, and the vertical ending point VE are detected from a screen where a reference pattern which indicates the entire video source coordinate system is embedded, and thus, the active video area is recognized.

The horizontal synchronous signal HSYNC is a signal that is used to synchronize a horizontal line and is generated whenever a horizontal line begins. The vertical synchronous signal VSYNC is a signal that is used to synchronize a frame and is generated whenever a frame begins.

The horizontal length HMAX and the vertical length VMAX refer to an x-axis maximum length and a y-axis maximum length in the video source coordinate system, respectively. The horizontal length HMAX and the vertical length VMAX are determined depending on the screen resolution of the video source, and thus the horizontal starting point HS, the horizontal ending point HE, the vertical starting point VS, and the vertical ending point VE need to be read by the display device. For example, when the screen resolution of the computer is set to 800×600, the horizontal length HMAX and the vertical length VMAX are 800 and 600, respectively.

However, certain problems occur when four signals, i.e., the horizontal starting point HS, the horizontal ending point HE, the vertical starting point VS, and the vertical ending point VE, are detected by the display device.

When a video signal to be displayed on the display device is a continuous analog signal, the following problems occur when the active video area is detected by the display device.

FIG. 2 illustrates two examples of a waveform of a video signal. In general, a video signal appears after a predetermined amount of time passes, following generation of a horizontal synchronous signal, which indicates the start of a horizontal line.

In order to determine the existence of the video signal in a predetermined area, a black level should be clearly defined. The black level is a critical value which indicates the range under which a video signal does not exist. When the level of a signal is less than the black level, a video signal does not exist in that signal.

Thus, when a received analog video signal is compared with the black level using a comparator, if the level of the analog video signal is greater than the black level, a video signal exists. If not, the video signal does not exist.

However, when an unprocessed analog video signal is compared with the black level using the comparator to determine the existence of a video signal, the difference between the waveform of the signal and the black level is not always clear.

In part (a) of FIG. 2, the video signal is primarily comprised of signals larger than the black level. In this case, it is easy to determine the existence of the video signal. In part (b) of FIG. 2, the video signal includes signals near the level of the black level. Thus, in this case, it is difficult to determine the existence of the video signal. Hence, it is difficult to detect the active video area.

FIG. 3 illustrates the screen of the display device with a brightness gradient. As shown in FIG. 3, in the case of the screen with a brightness gradient, if the black level is varied into first, second, and third levels (Level 1, Level 2, and Level 3) according to variations in temperature or process, the area that is recognized as the video signal, i.e., the active video area, is accordingly changed into first, second, and third areas VD_OUT1, VD_OUT2, and VD_OUT3, respectively.

FIGS. 4 and 5 illustrate cases where the background screen of the display device is used to explain the difficulty in recognizing the active video area.

As shown in FIG. 4, assuming a user designates the background color of a screen as black or a color close to black and assuming objects excluding black are placed on the screen, when the user intends to obtain position information of the active video area using an unprocessed analog video signal, under the same conditions, the possibility that the active video area is incorrectly measured is increased as compared to the case where the background color is white.

Thus, as shown in FIG. 4, even though the background screen is actually in the active video area, if the background screen is black, it is recognized that the video signal exists only in icons or a status bar that are any color other than black. Thus, the position information of the active video area cannot be accurately obtained.

As shown in FIG. 5, when objects move on the black background screen, the active video area may be changed whenever the active video area is detected by the display device. Because of the emergence of multimedia functions that involve the movement of decoration icons of the screen, in the case of a dynamic background screen, as in a gray ball-shaped icon which moves on the black background screen shown in FIG. 5, the area that is recognized as the active video area varies at each movement.

Thus, a method for clearly recognizing the active video area on the display video is required in any case. The analog video area should be clearly recognized so that the coordinates of the video source are correctly mapped to the coordinates of the display device, for example according to the relationship of Equation 1.

SUMMARY OF THE INVENTION

To address the above limitations, it is a first objective of the present invention to provide a circuit for correctly detecting an active video area of a display device, using a reference pattern.

It is a second objective of the present invention to provide a method for correctly detecting an active video area of a display device, using a reference pattern.

It is a third objective of the present invention to provide a method for correctly mapping coordinates between a video source and a display device by correctly detecting an active video area of the display device, using a reference pattern.

It is a fourth objective of the present invention to provide a display device having a circuit for correctly detecting an active video area.

Accordingly, to achieve the first objective, there is provided a circuit for detecting an active video area for a display device. The circuit includes a comparison signal generator which compares continuously received R, G, and B signals with a predetermined black level and outputs a comparison signal which indicates the existence of a video signal, a horizontal starting point detecting unit which detects a horizontal starting point, which is a minimum coordinate in a horizontal direction of the display device, in which the comparison signal has a predetermined first logic level, a horizontal ending point detecting unit which detects a horizontal ending point, which is a maximum coordinate in the horizontal direction of the display device, in which the comparison signal has the predetermined first logic level, a vertical starting point detecting unit which detects a vertical starting point, which is a minimum coordinate in a vertical direction of the display device, in which the comparison signal has the predetermined first logic level, and a vertical ending point detecting unit which detects a vertical ending point, which is a maximum coordinate in the vertical direction of the display device, in which the comparison signal has the predetermined first logic level. A predetermined reference pattern is embedded in the R, G, and B signals.

It is preferable that the horizontal starting point, the horizontal ending point, the vertical starting point, and the vertical ending point, respectively, are represented as a counter value that is synchronized with a system clock signal of the display device.

To achieve the second objective, there is provided a method for detecting an active video area for a display device. The method includes (a) comparing continuously received R, G, and B signals with a predetermined black level and outputting a comparison signal which indicates the existence of a video signal, (b) detecting a horizontal starting point, which is a minimum coordinate in a horizontal direction of the display device, in which the comparison signal has a predetermined first logic level, (c) detecting a horizontal ending point, which is a maximum coordinate in the horizontal direction of the display device, in which the comparison signal has the predetermined first logic level, (d) detecting a vertical starting point, which is a minimum coordinate in a vertical direction of the display device, in which the comparison signal has the predetermined first logic level, and (e) detecting a vertical ending point, which is a maximum coordinate in the vertical direction of the display device, in which the comparison signal has the predetermined first logic level. A predetermined reference pattern is embedded in the R, G, and B signals.

It is preferable that the horizontal starting point, the horizontal ending point, the vertical starting point, and the vertical ending point, respectively, are represented as a counter value that is synchronized with a system clock signal of the display device.

To achieve the third objective, there is provided a method for mapping coordinates of a video source to coordinates of a display device. The method includes (a) selecting a predetermined area of the video source, (b) generating a predetermined reference pattern, (c) transmitting R, G, and B signals in which the reference pattern is embedded, to the display device, (d) comparing the R, G, and B signals with a predetermined black level and outputting a comparison signal which indicates the existence of a video signal, (e) detecting a horizontal starting point, a horizontal ending point, a vertical starting point, and a vertical ending point using the comparison signal, and (f) converting the selected predetermined area of the video source into an area of the display device, using a predetermined mapping relationship and the detected horizontal starting point, the detected horizontal ending point, the detected vertical starting point, and the detected vertical ending point.

It is preferable that the method further includes (g) performing a predetermined function in the converted area of the display device.

To achieve the fourth objective, there is provided a display device for receiving a video signal from a video source and displaying the video signal. The device includes a detection circuit which receives R, G, and B signals, in which a predetermined reference pattern is embedded, and detects an active video area, a micro-controller (MCU) which converts a selected area of the video source into an area of the display device using coordinate information of the selected area of the video source and the active video area, and a function control circuit which receives information on the converted area of the display device and performs a predetermined function in the converted, area of the display device.

It is preferable that the detection circuit includes a comparison signal generator which compares the R, G, and B signals with a predetermined black level and outputs a comparison signal which indicates the existence of a video signal, a horizontal starting point detecting unit which detects a horizontal starting point, which is a minimum coordinate in a horizontal direction of the display device, in which the comparison signal has a predetermined first logic level, a horizontal ending point detecting unit which detects a horizontal ending point, which is a maximum coordinate in the horizontal direction of the display device, in which the comparison signal has the predetermined first logic level, a vertical starting point detecting unit which detects a vertical starting point, which is a minimum coordinate in a vertical direction of the display device, in which the comparison signal has the predetermined first logic level, and a vertical ending point detecting unit which detects a vertical ending point, which is a maximum coordinate in the vertical direction of the display device, in which the comparison signal has the predetermined first logic level.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF PREFERRED EMBODIMENTS

Figure 1:
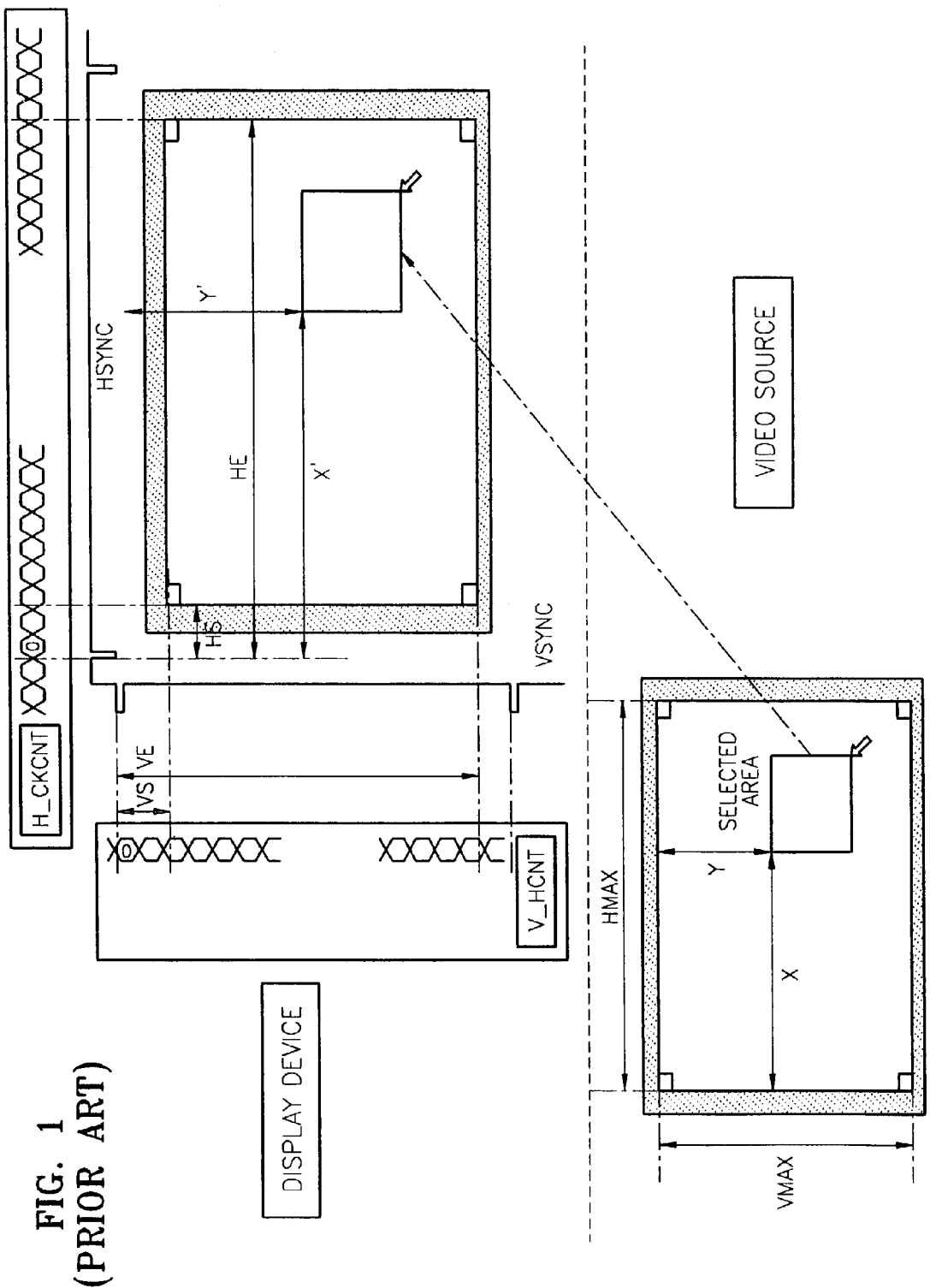
FIG. 1 illustrates a relationship between a conventional coordinate system for a video source and a conventional coordinate system for a display device.
Figure 2:
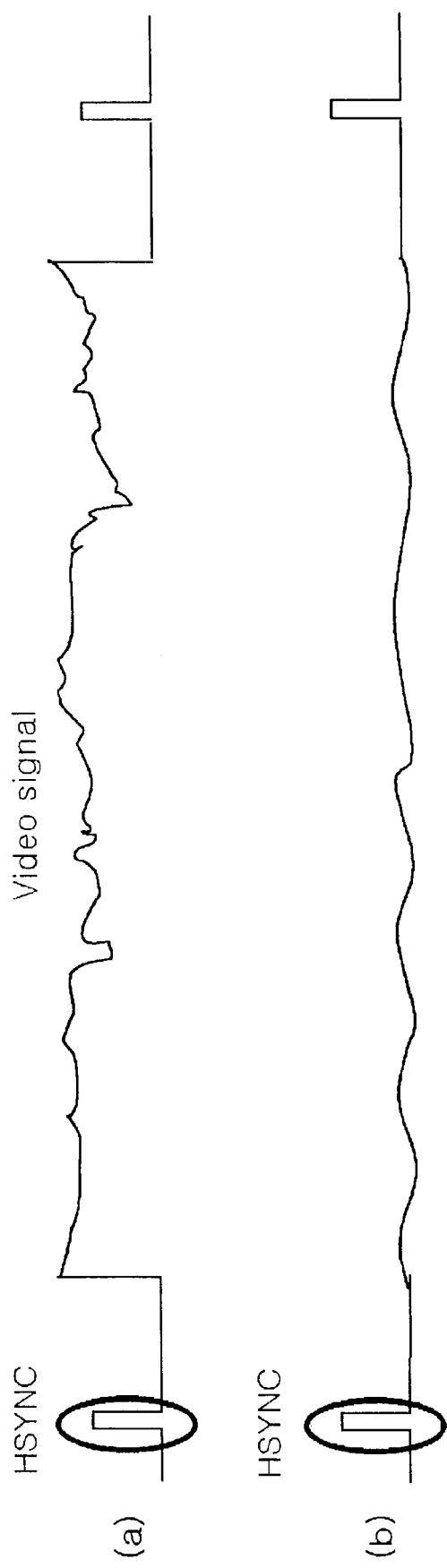
FIG. 2 illustrates two examples of a waveform of a video signal.

The present invention will be described more fully hereinafter with reference to the accompanying drawings in which preferred embodiments of the invention are shown. Prior to describing a preferred embodiment of the present invention in detail with reference to the accompanying drawings, an overview of the concept of the present invention will now be described.

In the present invention, a reference pattern which indicates the start and end of an active video area is embedded in an analog video signal and is transmitted to a display device. In this case, the reference patterns embedded in the analog video signal include a signal having a level which is clearly discriminated from a black level. Thus, when the analog video signal is compared with the black level using a comparator, when the existence of a video signal is determined in the horizontal and vertical starting and ending positions of the display device, the variation in the black level does not affect this determination. This is because signals having colors such as white, red, green, and blue with a high brightness are used as the embedded reference pattern such that the embedded reference pattern has a significant margin with respect to the small variation in the black level.

The reference pattern is placed at edges of the screen for a minimum amount of time when the active video area is detected. Thus, the reference pattern does not adversely affect a user's work.

In addition, the position of the active video area is detected by the coordinate system of the display device using the reference pattern, and a predetermined area of a video source is correctly mapped to an area of the display device using the position of the detected active video area.

Hereinafter, the present invention will be described in detail by describing preferred embodiments of the invention with reference to the accompanying drawings. Like reference numerals refer to like elements throughout the drawings.

Figure 6A:
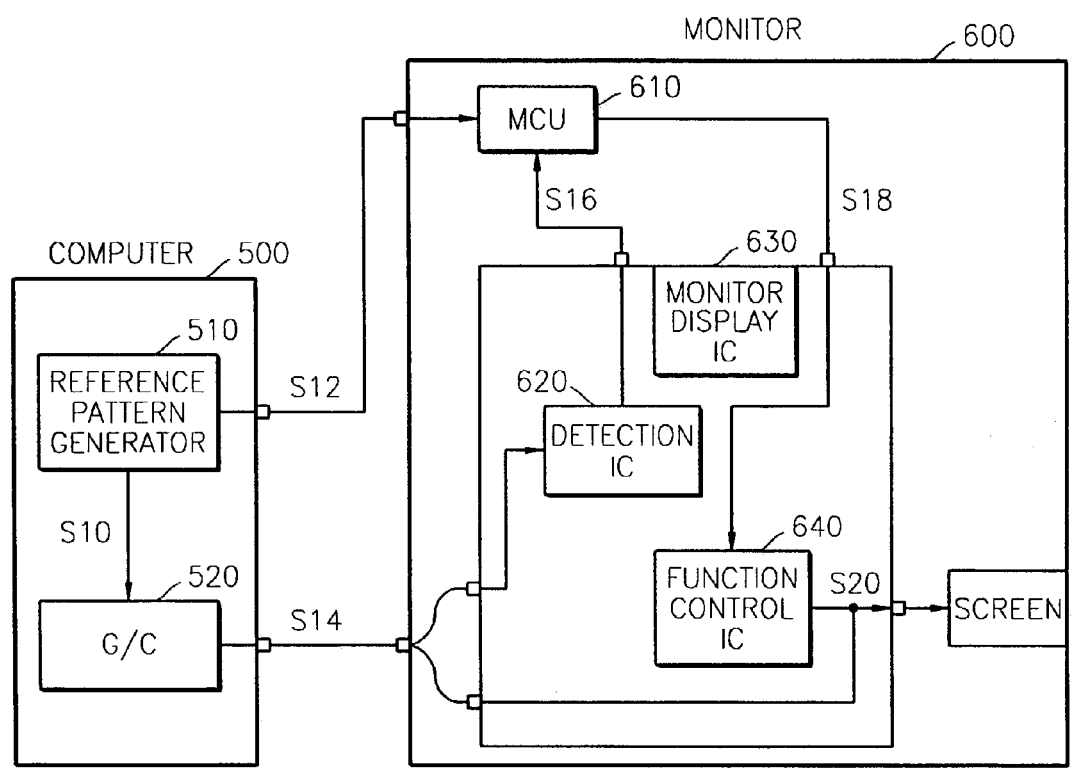
FIG. 6A is a block diagram illustrating the relationship between internal functional blocks of a computer and a monitor in a mapping process between coordinate systems of a video source (computer) and a display device (monitor) according to an embodiment of the present invention.
Figure 6B:
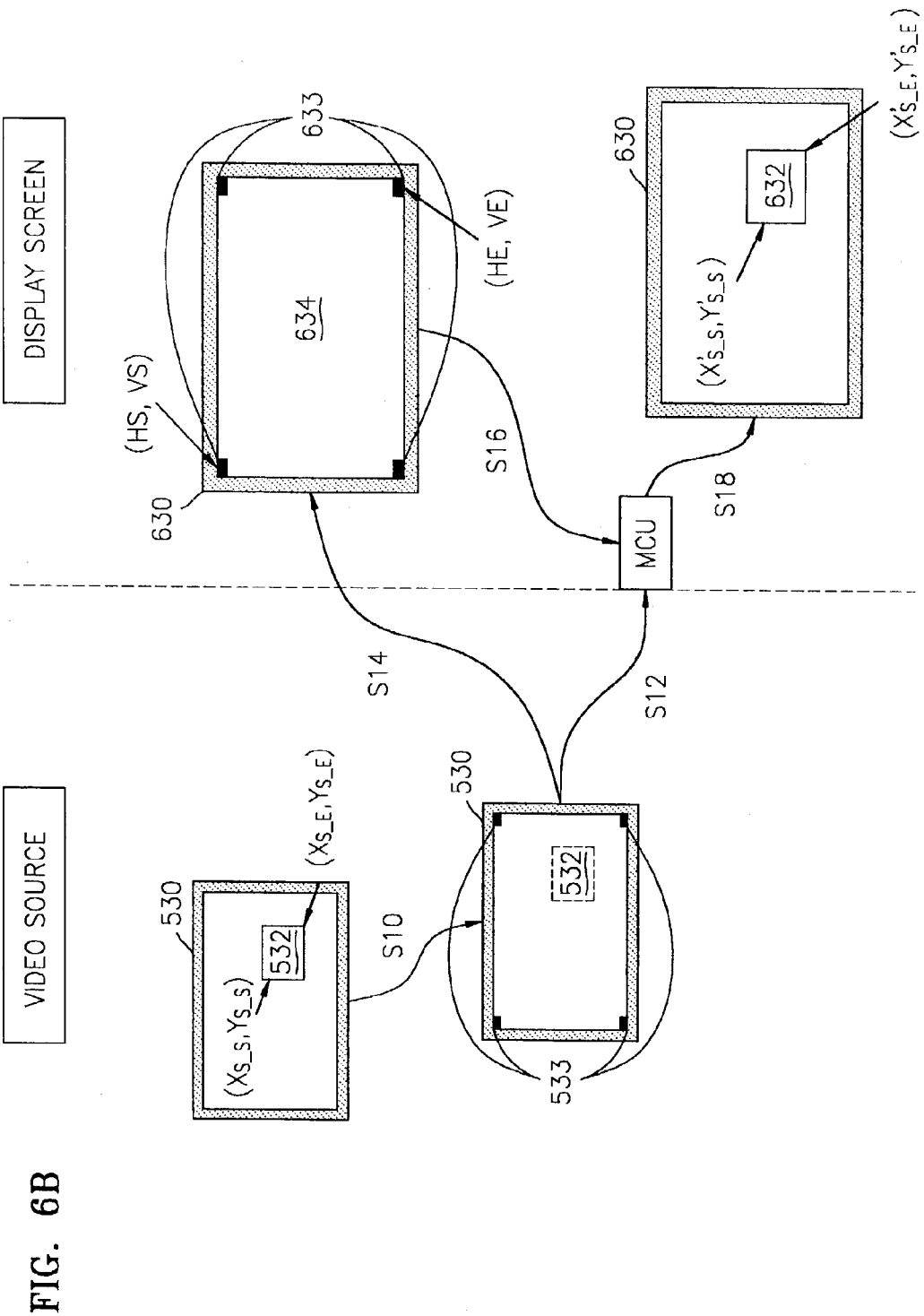
FIG. 6B illustrates a mapping process between coordinate systems of a video source and a display device according to an embodiment of the present invention.

FIGS. 6A and 6B illustrate a block diagram of a process of recognizing an active video area according to an embodiment of the present invention and a process of mapping coordinates of a video source to coordinates of a display device using the recognized active video area, respectively.

In the present example, a computer is used for the video source, and a monitor is used for the display device.

The block diagram of FIG. 6A illustrates the relationship between internal functional blocks of a computer and a monitor in a mapping process between coordinate systems of a video source (computer) and a display device (monitor) according to an embodiment of the present invention, and FIG. 6B illustrates a mapping process between coordinate systems of a video source and a display device according to an embodiment of the present invention.

Referring to FIG. 6A, a computer 500 includes a computer graphic card (G/C) 520 and a reference pattern generator 510. The reference pattern generator 510 is implemented by a software unit and generates a reference pattern which assists in the process of clear detection of the active video area.

A monitor 600 includes a micro-controller (MCU) 610, a detection integrated circuit (IC) 620, a monitor display IC 630, and a function control IC 640. The detection IC 620 detects the active video area in terms of the value counted by a system clock signal of the monitor using an analog video signal in which the reference pattern is embedded. The MCU 610 controls the monitor 600. The function control IC 640 receives a command from the MCU 610 and performs a predetermined function in an area designated by the MCU 610. The monitor display IC 630 performs a display function of the monitor 600 and may include the detection IC 620 and the function control IC 640.

A coordinate mapping process will be described with reference to FIGS. 6A and 6B.

First, a predetermined area to be mapped is selected on an O/S screen using a pointing device. In step S10, the reference pattern generator 510 is driven immediately after the predetermined area is selected, and a reference pattern 533 which indicates the active video area is embedded in video memory of the G/C 520 for a minimum amount of time.

In step S12, the reference pattern generator 510 transmits coordinate values $(X_{S\_S}, X_{S\_E})$ and $(Y_{S\_S}, Y_{S\_E})$ of a video source 530 of a selected area 610. In this case, the resolution of the video source 530, i.e., a horizontal length HMAX and a vertical length VMAX of the video source 530, are also transmitted to the MCU 610.

In step S14, the G/C 520 transmits a video signal in which the reference pattern 533 is embedded, to the monitor 600.

Thus, a reference pattern 633 appears on a monitor screen 630 for a predetermined period of time. In step S16, the detection IC 620 receives the video signal in which the reference pattern 633 is embedded from the G/C 520, detects a horizontal starting point HS, a horizontal ending point HE, a vertical starting point VS, and a vertical ending point VE, which comprise the active video area information, from the video signal, and transmits the horizontal starting point HS, the horizontal ending point HE, the vertical starting point VS, and the vertical ending point VE to the MCU 610. An area 634 that is surrounded by, or between, the detected horizontal starting point HS, the detected horizontal ending point HE, the detected vertical starting point VS, and the detected vertical ending point VE is therefore determined as the active video area.

In step S18, the MCU 610 calculates mapping coordinate values $(X'_{S\_S}, X'_{S\_E})$ and $(Y'_{S\_S}, Y'_{S\_E})$ of the selected area 532 using Equation 1 and transmits the calculated mapping coordinate values to the function control IC 640.

In step S20, the function control IC 640 receives the mapped coordinate values $(X'_{S\_S}, X'_{S\_E})$ and $(Y'_{S\_S}, Y'_{S\_E})$ of the selected area 532 f a predetermined function, such as contrast or sharpness adjustment, in a corresponding area 632.

By performing the above steps, the selected area of the O/S screen, i.e., the selected area of the video memory coordinate system of the G/C, is correctly mapped on the monitor screen such that a predetermined function is performed only in the selected area.

Figure 7:
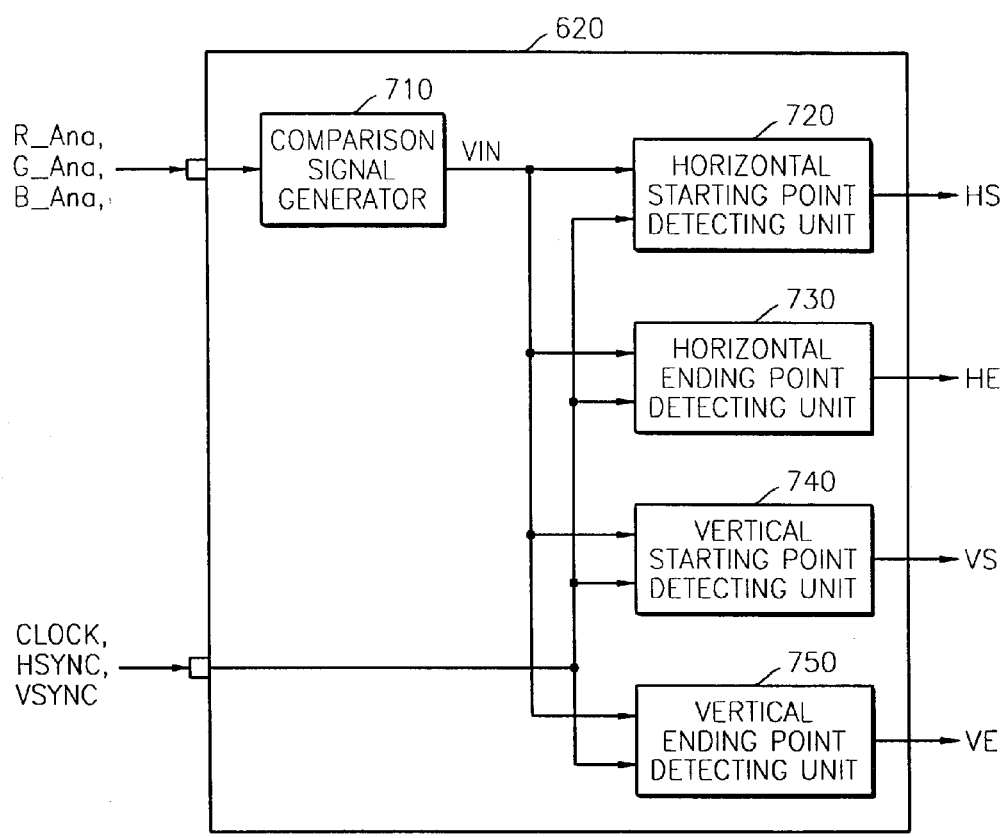
FIG. 7 is a block diagram schematically illustrating the detection integrated circuit (IC) shown in FIG. 6A.

FIG. 7 is a block diagram schematically illustrating the detection IC 620 shown in FIG. 6A. The detection IC 620 performs a detection function of the active video area, which is an essential function in the above mapping steps.

Referring to FIG. 7, the detection IC 620 includes a comparison signal generator 710, a horizontal starting point detecting unit 720, a horizontal ending point detecting unit 730, and a vertical starting point 740, and a vertical ending point detecting unit 750.

The comparison signal generator 710 receives R, G, and B analog signals R_Ana, G_Ana, and B_Ana, compares the R, G, and B analog signals R_Ana, G_Ana, and B_Ana with a black level BL, respectively, and outputs a comparison signal VIN which indicates the existence of an analog signal. Here, the R, G, and B analog signals R_Ana, G_Ana, and B_Ana are R, G, and B signals in which a reference pattern is embedded.

Figure 8:
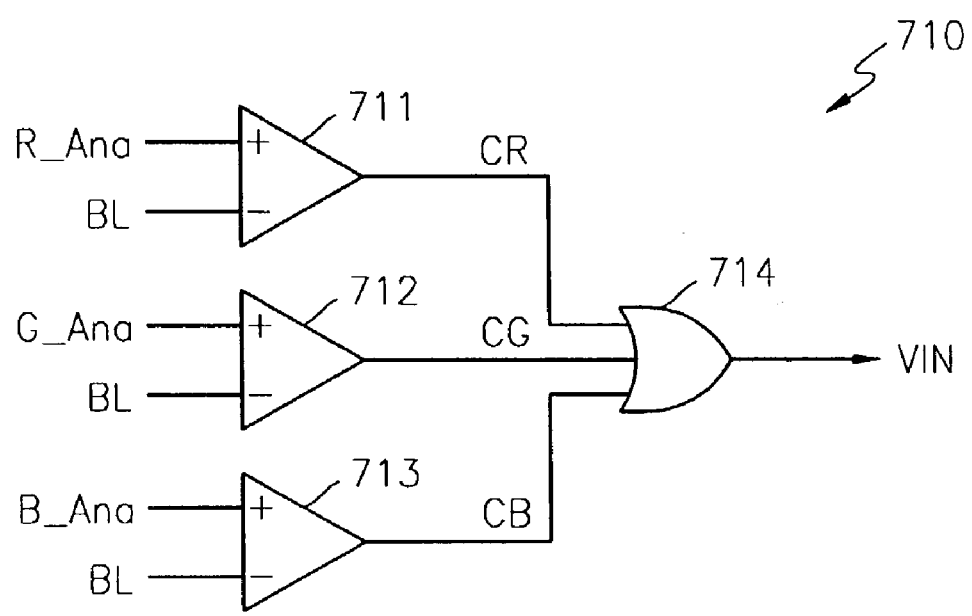
FIG. 8 is a circuit diagram illustrating detailed structure of the comparison signal generator shown in FIG. 7.

The detailed structure of the comparison signal generator 710 is shown in FIG. 8. Referring to FIG. 8, the comparison signal generator 710 includes R, G, and B comparators 711, 712, and 713 and an OR arithmetic unit 714.

The R comparator 711 receives an R analog signal R_Ana and compares the R analog signal R_Ana with the black level BL. If the R analog signal R_Ana is larger than the black level BL, the R comparator 711 generates an output signal CR having a first level (hereinafter, logic high), and if the R analog signal R_Ana is smaller than the black level BL, the R comparator 711 generates an output signal CR having a second level (hereinafter, logic low). A case where the R analog signal R_Ana is larger than the black level BL means that the R analog signal R_Ana exists.

The G and B comparators 712 and 713 compare a G analog signal G_Ana and a B analog signal B_Ana with the black level BL and generate output signals CG and CB having a logic high or low level, respectively, according to the comparison result in the same manner as comparator 711.

The OR arithmetic unit 714 performs an OR operation on the output signals CR, CG, and CB of the R, G, and B comparators 711, 712, and 713 and outputs a comparison signal VIN. If at least one of the output signals CR, CG, and CB of the R, G and B comparators 711, 712, and 713 is logic high, a comparison signal VIN having a logic high level is generated. A case where the comparison signal VIN is logic high means that the R and/or G and/or B analog signals exist. That is, the comparison signal VIN is a digital signal which indicates the existence of an analog video signal every time.

Returning to FIG. 7, the horizontal starting point detecting unit 720 receives the comparison signal VIN and detects and outputs a horizontal starting point HS. The horizontal starting point HS is a horizontal starting position of the active video area, is expressed by a horizontal clock count H_CKCNT, and is updated at every frame. The horizontal clock count H_CKCNT is a value in which the number of horizontal clock signals CLOCKs is counted and is related to X' coordinates. The horizontal clock count H_CKCNT is reset by a horizontal synchronous signal HSYNC which indicates the start of a horizontal line. The horizontal clock signal CLOCK is one of the system clock signals of the monitor, which is generated by dividing the horizontal synchronous signal HSYNC using a phase locked loop (PLL) circuit.

Thus, if the smallest value of the horizontal clock count H_CKCNT when the comparison signal VIN is '1' is detected at a frame, the value is the horizontal starting point HS at that frame.

Figure 9:
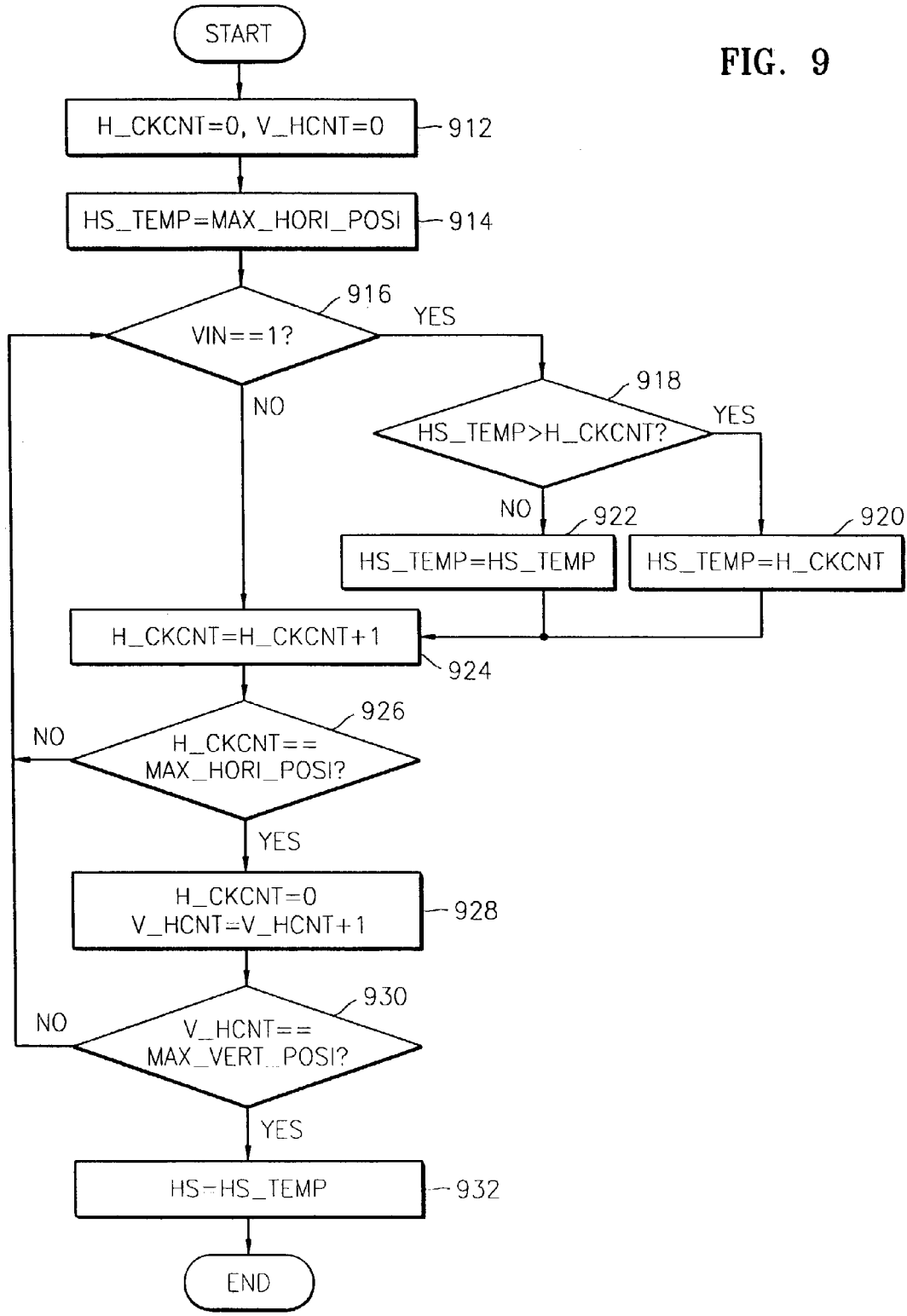
FIG. 9 is a flow diagram illustrating the operation of the horizontal starting point detecting unit shown in FIG. 7.

FIG. 9 is a flow chart illustrating the operation of the horizontal starting point detecting unit shown in FIG. 7. The operation of the horizontal starting point detecting unit 720 will be described with reference to FIG. 9 in greater detail below.

In step 912, the horizontal clock count H_CKCNT and a vertical line count V_HCNT are set to '0'. In step 914, a temporary horizontal starting point HS_TEMP is set to a horizontal maximum value MAX_HORI_POSI. The vertical line count V_HCNT is a value in which the number of horizontal lines, i.e., the horizontal synchronous signal HSYNC, is counted. The vertical line count V_HCNT is reset by the vertical synchronous signal VSYNC and is related to Y' coordinates. Here, an assumption is made that all variables in use are 11-bit.

In step 916, if all variables are initialized, it is determined whether the comparison signal VIN is '1'. If the comparison signal VIN is '1', in step 918, the temporary horizontal starting point HS_TEMP is compared with the horizontal clock count H_CKCNT. If the horizontal clock count H_CKCNT is smaller than the temporary horizontal starting point HS_TEMP, in step 920, the temporary horizontal starting point HS_TEMP is updated to the horizontal clock count H_CKCNT. If the horizontal clock count H_CKCNT is not smaller than the temporary horizontal starting point HS_TEMP, in step 922, the temporary horizontal starting point HS_TEMP is maintained.

In step 924, the horizontal clock count H_CKCNT is increased by '1'. In step 926, it is determined whether the horizontal clock count H_CKCNT reaches the horizontal maximum value MAX_HORI_POSI, that is, whether the horizontal clock count H_CKCNT indicates the end of a horizontal line. The above steps 916 through 924 are repeatedly performed until the horizontal clock count H_CKCNT reaches the horizontal maximum value MAX_HORI_POSI.

If the horizontal clock count H_CKCNT reaches the horizontal maximum value MAX_HORI_POSI, in step 928, the horizontal clock count H_CKCNT is reset to '0', and the vertical line count V_HCNT is increased by '1'. The above steps 916 through 928 are repeatedly performed until the vertical line count V_HCNT reaches a vertical maximum value MAX_VERT_POSI.

If the vertical line count V_HCNT reaches the vertical maximum value MAX_VERT_POSI, that is, if one frame is ended, in step 932, the temporary horizontal starting point HS_TEMP is finally transferred to the horizontal starting point HS of a corresponding frame. The process of detecting the horizontal starting point HS at the corresponding frame is ended.

In conclusion, the horizontal starting point detecting unit 720 searches for a minimum value of the values of the horizontal clock count H_CKCNT in which the comparison signal VIN is '1', in units of frames (screen), and outputs the minimum value as the horizontal starting point HS. Thus, the horizontal starting point HS is the minimum horizontal clock count H_CKCNT in which an analog signal exists.

Figure 10:
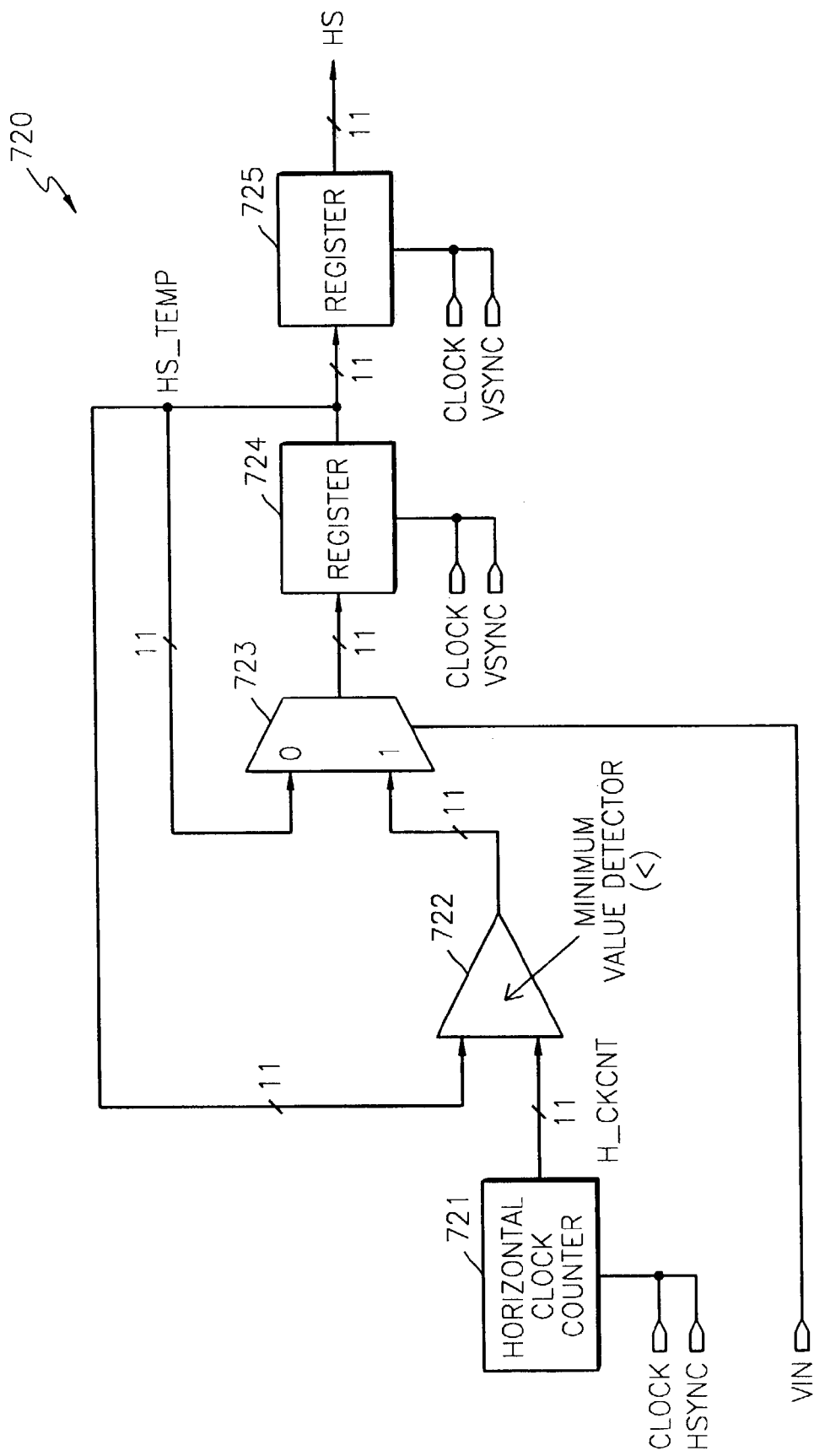
FIG. 10 is a circuit diagram illustrating an example of the horizontal starting point detecting unit shown in FIG. 7.

FIG. 10 is a circuit diagram illustrating an example of the horizontal starting point detecting unit 720 shown in FIG. 7. The operation of the horizontal starting point detecting unit 720 may be performed by the circuit shown in FIG. 10. Referring to FIG. 10, the horizontal starting point detecting unit 720 includes a horizontal clock counter 721, a minimum value detector 722, a multiplexer 723, and registers 724 and 725.

The horizontal clock counter 721 counts the horizontal clock signal CLOCK and generates the horizontal clock count H_CKCNT. The horizontal clock signal CLOCK is a system clock signal of the monitor generated by dividing the horizontal synchronous signal HSYNC using the PLL circuit. The horizontal clock counter 721 is reset by the horizontal synchronous signal HSYNC at the outset of a the generation of a horizontal line.

The minimum value detector 722 is a comparator that compares the temporary horizontal starting point HS_TEMP with the horizontal clock count H_CKCNT and outputs a minimum value. The multiplexer 723 receives the output of the minimum value detector 722 and the temporary horizontal starting point HS_TEMP. If the comparison signal VIN is logic high, the multiplexer 723 outputs the output signal of the minimum value detector 722 for updating the temporary horizontal starting point HS_TEMP. If the comparison signal VIN is logic low, the temporary horizontal starting point HS_TEMP is maintained.

In this manner, the temporary horizontal starting point register 724 stores the smaller value of the previous value and the value of the horizontal clock count H_CKCNT as the temporary horizontal starting point HS_TEMP when the comparison signal VIN is logic high. At first, temporary horizontal starting point register 724 is set to the horizontal maximum value MAX_HORI_POSI by the vertical synchronous signal VSYNC at the initial stage of each frame.

The second horizontal starting point register 725 receives the temporary horizontal starting point HS_TEMP as the horizontal starting point HS at the end of each frame.

Returning to FIG. 7, the horizontal ending point detecting unit 730 receives the comparison signal VIN and detects and outputs the horizontal ending point HE. The horizontal ending point HE is a horizontal ending position of the active video area, is expressed by the horizontal clock count H_CKCNT, and is updated at every frame.

Figure 11:
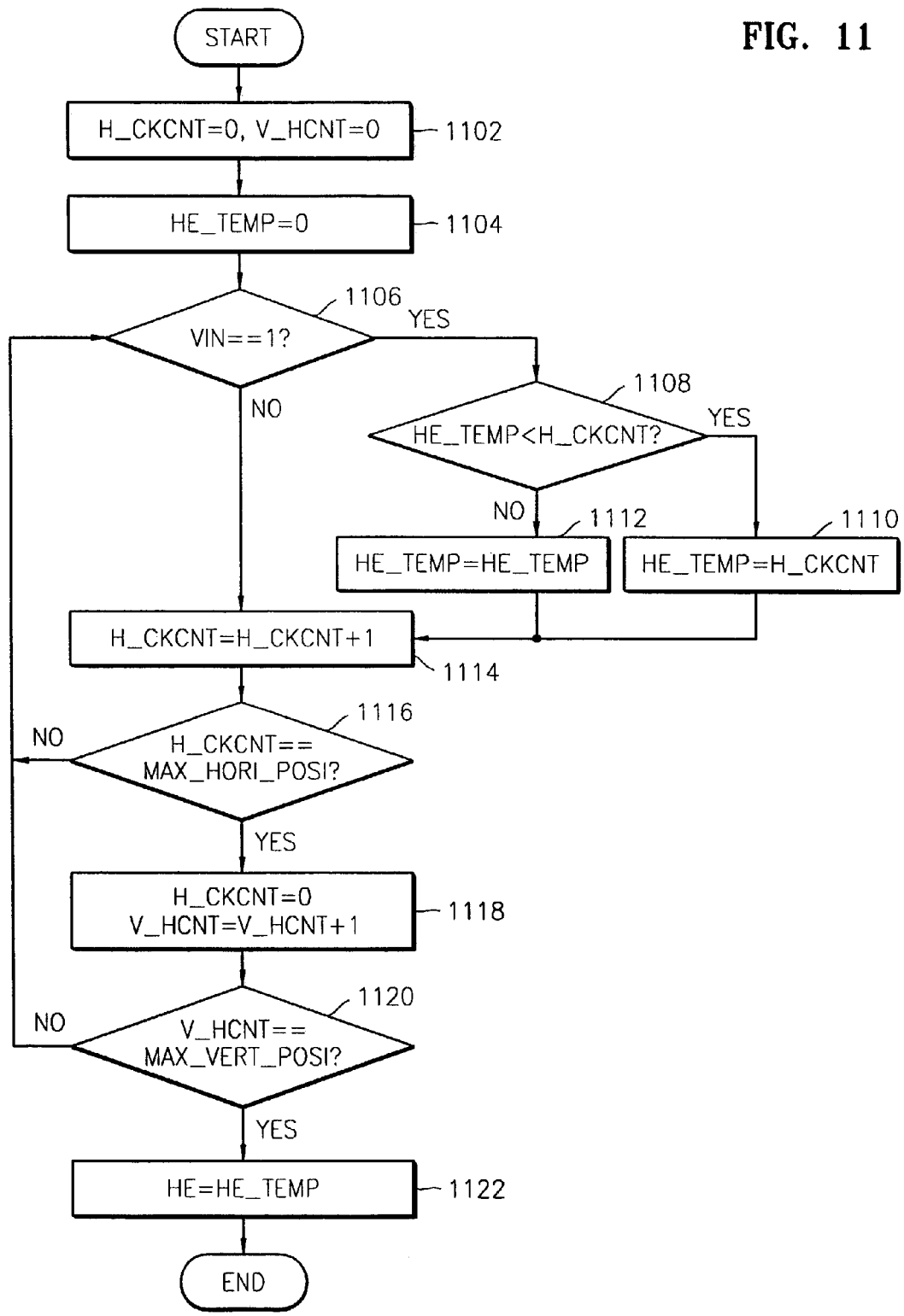
FIG. 11 is a flow chart illustrating the operation of the horizontal ending point detecting unit shown in FIG. 7.

FIG. 11 is a flow chart illustrating the operation of the horizontal ending point detecting unit 730 shown in FIG. 7. The operation of the horizontal ending point detecting unit 730 will be described with reference to FIG. 11 in greater detail below.

In step 1102, the horizontal clock count H_CKCNT and the vertical line count V_HCNT are set to '0'. In step 1104, a temporary horizontal ending point HE_TEMP is set to a horizontal minimum value '0'.

In step 1106, if all variables are initialized, it is determined whether the comparison signal VIN is '1'. If the comparison signal VIN is '1', in step 1108, the temporary horizontal ending point HE_TEMP is compared with the horizontal clock count H_CKCNT. If the horizontal clock count H_CKCNT is larger than the temporary horizontal ending point HE_TEMP, in step 1110, the temporary horizontal ending point HE_TEMP is updated to the horizontal clock count H_CKCNT. If the horizontal clock count H_CKCNT is not larger than the temporary horizontal ending point HE_TEMP, in step 1112, the temporary horizontal ending point HE_TEMP is maintained.

In step 1114, the horizontal clock count H_CKCNT is increased by '1' until the horizontal clock count H_CKCNT reaches the horizontal maximum value MAX_HORI_POSI, that is, until one horizontal line is ended, and simultaneously the above steps 1106 through 1114 are repeatedly performed.

In step 1116, if the horizontal clock count H_CKCNT reaches the horizontal maximum value MAX_HORI_POSI, the horizontal clock count H_CKCNT is reset to '0', and the vertical line count V_HCNT is increased by '1' in step 1118.

The above steps 1106 through 1118 are repeatedly performed until the vertical line count V_HCNT reaches the vertical maximum value MAX_VERT_POSI.

If the vertical line count V_HCNT reaches the vertical maximum value MAX_VERT_POSI, that is, if one frame is ended, in step 1122, the temporary horizontal ending point HE_TEMP is finally transferred to the horizontal ending point HE of a corresponding frame. The process of detecting the horizontal ending point HE at the corresponding frame is ended.

In conclusion, the horizontal ending point detecting unit 730 searches for a maximum value of the values of the horizontal clock count H_CKCNT in which the comparison signal VIN is '1', in units of frames (screen), and outputs the maximum value as the horizontal ending point HE. Thus, the horizontal ending point HE is the maximum horizontal clock count H_CKCNT in which an analog signal exists.

Figure 12:
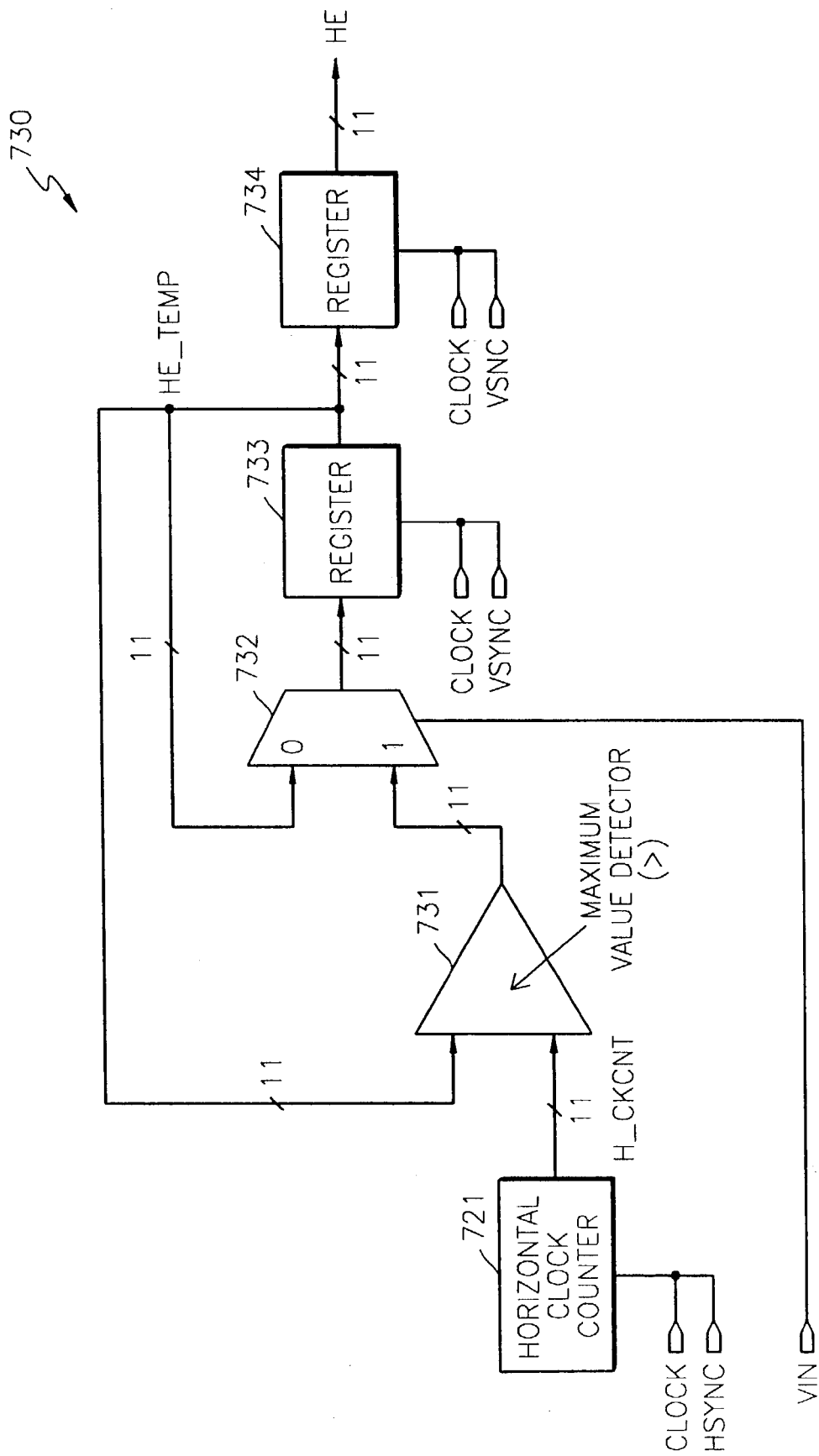
FIG. 12 is a circuit diagram illustrating an example of the horizontal ending point detecting unit shown in FIG. 7.

FIG. 12 is a circuit diagram illustrating an example of the horizontal ending point detecting unit 730 shown in FIG. 7. The operation of the horizontal ending point detecting unit 730 may be performed by the circuit shown in FIG. 12. Referring to FIG. 12, the horizontal ending point detecting unit 730 includes a horizontal clock counter 721, a maximum value detector 731, a multiplexer 732, and registers 733 and 734.

The horizontal clock counter 721 counts the horizontal clock signal CLOCK, generates the horizontal clock count H_CKCNT, and is reset by the horizontal synchronous signal HSYNC when each horizontal line starts.

The maximum value detector 731 is a comparator that compares the temporary horizontal ending point HE_TEMP with the horizontal clock count H_CKCNT and outputs a maximum value. The multiplexer 732 receives the output of the maximum value detector 731 with the temporary horizontal ending point HE_TEMP. If the comparison signal VIN is logic high, the multiplexer 732 outputs the output signal of the maximum value detector 731 for updating the temporary horizontal ending point HE_TEMP. If the comparison signal VIN is logic low, the temporary horizontal ending point HE_TEMP is maintained.

Thus, the temporary horizontal ending point register 733 stores the smaller value of the previous value and the value of the horizontal clock count H_CKCNT as the temporary horizontal ending point HE_TEMP when the comparison signal VIN is logic high. The temporary horizontal ending point register 733 is set to '0' by the vertical synchronous signal VSYNC at the initial stage of each frame.

The horizontal ending point register 734 receives the temporary horizontal ending point HE_TEMP as the horizontal ending point HE when each frame has ended.

Returning to FIG. 7, the vertical starting point detecting unit 740 receives the comparison signal VIN and detects and outputs the vertical starting point VS. The vertical starting point VS is a vertical starting position of the active video area, is expressed by the vertical line count V_HCNT, and is updated in units of frames.

Figure 13:
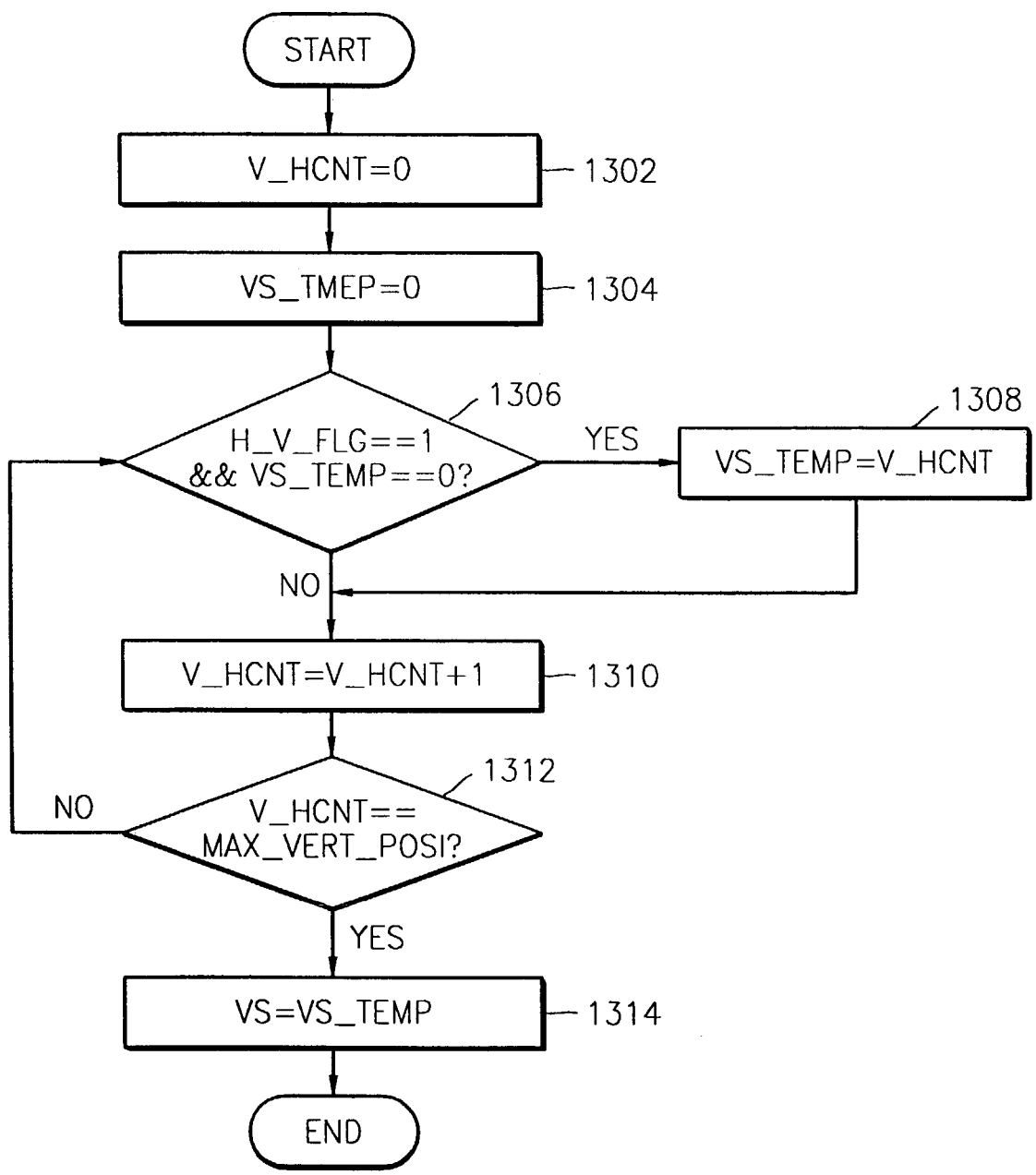
FIG. 13 is a flow chart illustrating the operation of the vertical starting point detecting unit shown in FIG. 7.

FIG. 13 is a flowchart illustrating the operation of the vertical starting point detecting unit 740 shown in FIG. 7.

The operation of the vertical starting point detecting unit 740 will be described with reference to FIG. 13 in greater detail below.

In step 1302, the vertical line count V_HCNT is set to '0'. In step 1304, a temporary vertical starting point VS_TEMP is also set to '0'.

In step 1306, it is determined whether a horizontal video flag signal H_V_FLG is '1' and the temporary vertical starting point VS_TEMP is '0'. The horizontal video flag signal H_V_FLG indicates the existence of a video signal in each horizontal line. If the video signal exists in a corresponding horizontal line, the horizontal video flag signal H_V_FLG is set to '1' during that horizontal line. If the video signal does not exist in a corresponding horizontal line, the horizontal video flag signal H_V_FLG is set to '0' during that horizontal line.

In step 1308, if the horizontal video flag signal H_V_FLG is '1' and the temporary vertical starting point VS_TEMP is '0', the temporary vertical starting point VS_TEMP is updated to the vertical line count V_HCNT. If the horizontal video flag signal H_V_FLG is not '1' or the temporary vertical starting point VS_TEMP is not '0', the temporary vertical starting point VS_TEMP is maintained.

In step 1310, the vertical line count V_HCNT is increased by '1' when one horizontal line is ended. In step 1312, it is determined whether the vertical line count V_HCNT is equal to the vertical maximum value MAX_VERT_POSI. The above steps 1306 through 1310 are repeatedly performed until the vertical line count V_HCNT reaches the vertical maximum value MAX_VERT_POSI.

If the vertical line count V_HCNT reaches the vertical maximum value MAX_VERT_POSI, that is, if one frame is ended, in step 1314, the temporary vertical starting point VS_TEMP is finally transferred to the vertical starting point VS of a corresponding frame. The process of detecting the vertical starting point at the corresponding frame is ended.

In conclusion, the vertical starting point detecting unit 740 searches for a minimum value of the values of the vertical line count V_HCNT in which the horizontal video flag signal H_V_FLG is '1', in units of frames (screen), and outputs the minimum value as the vertical starting point VS. Thus, the vertical starting point VS is the minimum vertical line count V_HCNT in which an analog signal exists.

Figure 14:
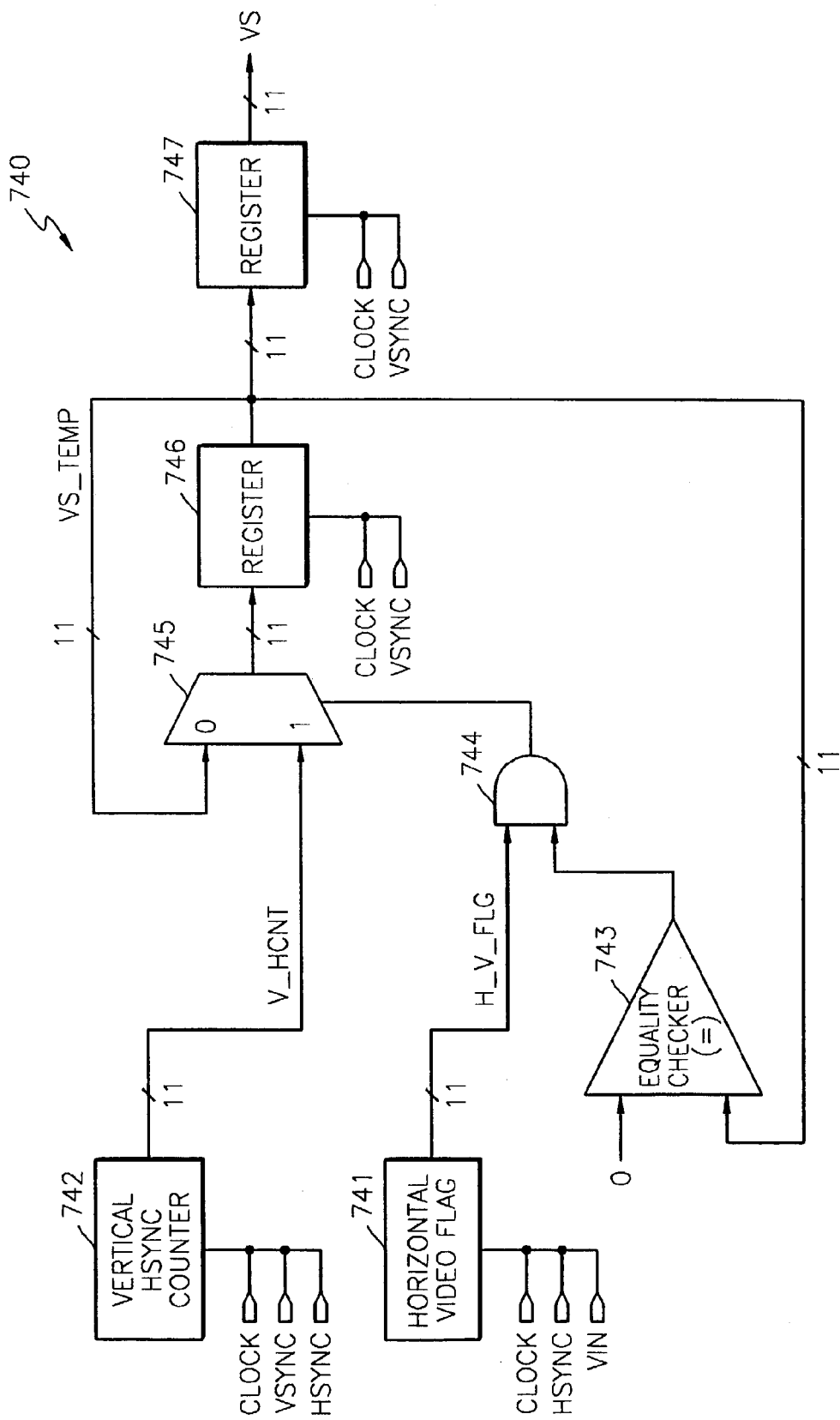
FIG. 14 is a circuit diagram illustrating an example of the vertical starting point detecting unit shown in FIG. 7.

FIG. 14 is a circuit diagram illustrating an example of the vertical starting point detecting unit 740 shown in FIG. 7. The operation of the vertical starting point detecting unit 740 may be performed by the circuit shown in FIG. 14. Referring to FIG. 14 the vertical starting point detecting unit 740 includes a vertical clock counter 742, a horizontal video flag signal generator 741, an equality checker 743, an AND gate 744, a multiplexer 745, and registers 746 and 747.

The vertical clock counter 742 counts the horizontal synchronous signal HSYNC which indicates the start of each horizontal line and outputs the vertical line count V_HCNT. The vertical clock counter 742 is reset by the vertical synchronous signal VSYNC when one frame starts.

The horizontal video flag signal generator 741 generates the horizontal video flag signal H_V_FLG which indicates the existence of a video signal in each horizontal line and is reset by the horizontal synchronous signal HSYNC at the initial stage of each horizontal line. The equality checker 743 generates an output signal having a logic high level when the temporary vertical starting point VS_TEMP is still '0'.

The multiplexer 745 outputs the vertical line count V_HCNT as the temporary vertical starting point VS_TEMP when the horizontal video flag signal H_V_FLG and the output of the equality checker 743 are logic high. If the horizontal video flag signal H_V_FLG or the output of the equality checker 743 is logic low, the multiplexer 745 outputs the temporary vertical starting point VS_TEMP. Thus, whenever the horizontal video flag signal H_V_FLG and the output of the equality checker 743 are logic high, the temporary vertical starting point register 746 updates and stores the vertical line count V_HCNT as the temporary vertical starting point VS_TEMP and is reset by the vertical synchronous signal VSYNC at the initial stage of each frame.

The vertical starting point register 747 receives the temporary vertical starting point VS_TEMP as the vertical starting point VS when each frame is ended.

Returning to FIG. 7, the vertical ending point detecting unit 750 receives the comparison signal VIN and detects and outputs the vertical ending point VE. The vertical ending point VE is a vertical ending position of the active video area, is expressed by the vertical line count V_HCNT, and is updated in units of frames.

Figure 15:
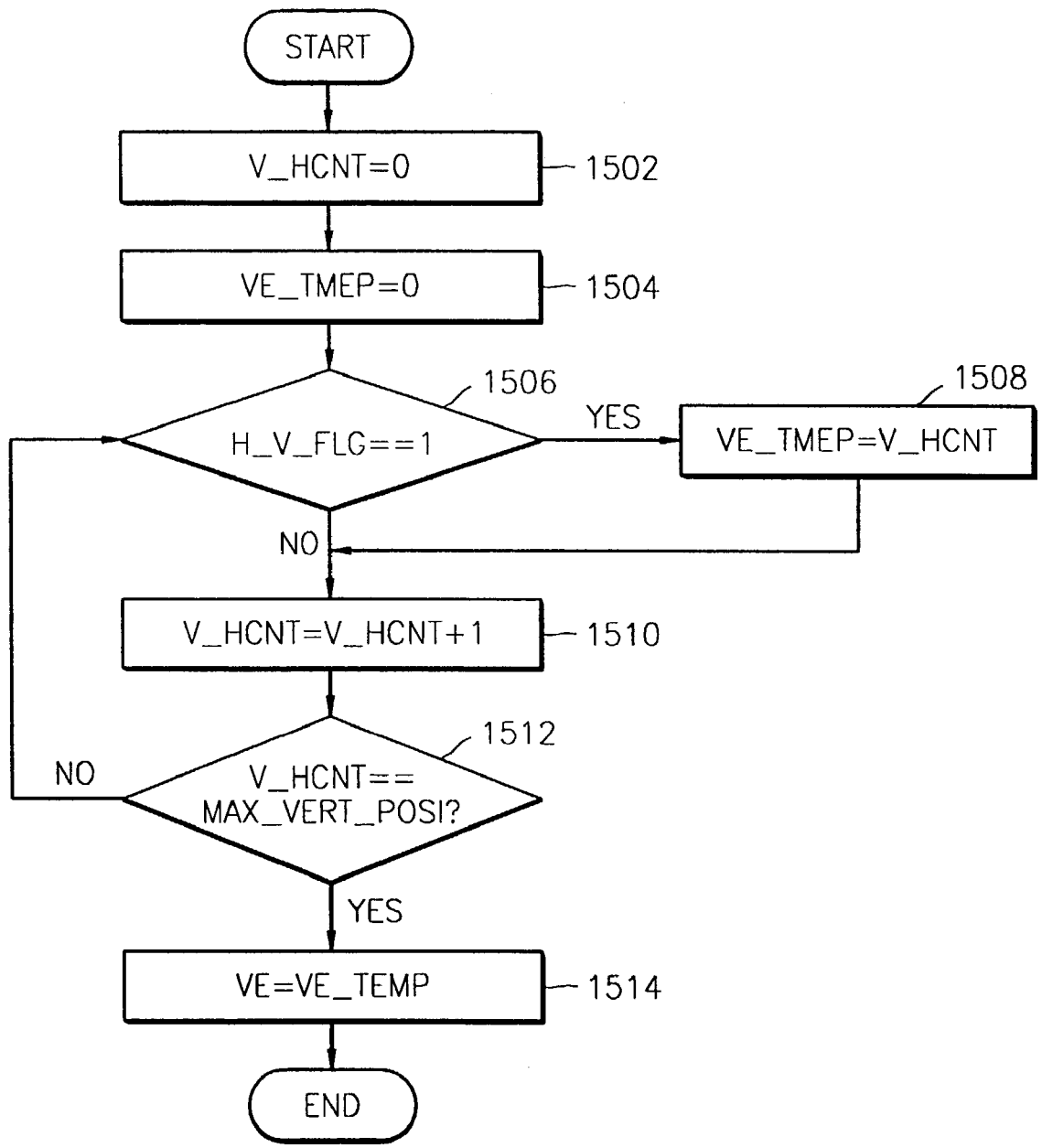
FIG. 15 is a flow chart illustrating the operation of the vertical ending point detecting unit shown in FIG. 7.

FIG. 15 is a flow chart illustrating the operation of the vertical ending point detecting unit 750 shown in FIG. 7. The operation of the vertical ending point detecting unit 750 will be described with reference to FIG. 15 in greater detail below.

In step 1502, the vertical line count V_HCNT is set to '0'. In step 1504, the temporary vertical ending point VE_TEMP is also set to '0'.

In step 1506, if all variables are initialized, it is checked whether the horizontal video flag signal H_V_FLG is '1'. If the horizontal video flag signal H_V_FLG is '1', in step 1508, the temporary vertical ending point VE_TEMP is updated to the vertical line count V_HCNT. If the horizontal video flag signal H_V_FLG is not '1', the temporary vertical ending point VE_TEMP is maintained.

In step 1510, while the vertical line count V_HCNT is increased by '1' until the vertical line count V_HCNT reaches the vertical maximum value MAX_VERT_POSI, simultaneously, the above steps 1506 through 1510 are repeatedly performed.

In step 1512, if the vertical line count V_HCNT reaches the vertical maximum value MAX_VERT_POSI, that is, if one frame is ended, in step 1514, the temporary vertical ending point VE_TEMP is finally transferred to the vertical ending point VE of a corresponding frame. A process of detecting the vertical ending point VE at the corresponding frame is ended.

In conclusion, the vertical ending point detecting unit 750 searches for a maximum value of the values of the vertical line count V_HCNT in which the horizontal video flag signal H_V_FLG is '1', in units of frames (screen) and outputs the maximum value as the vertical ending point VE. Thus, the vertical ending point VE is the maximum vertical line count V_HCNT in which an analog signal exists.

Figure 16:
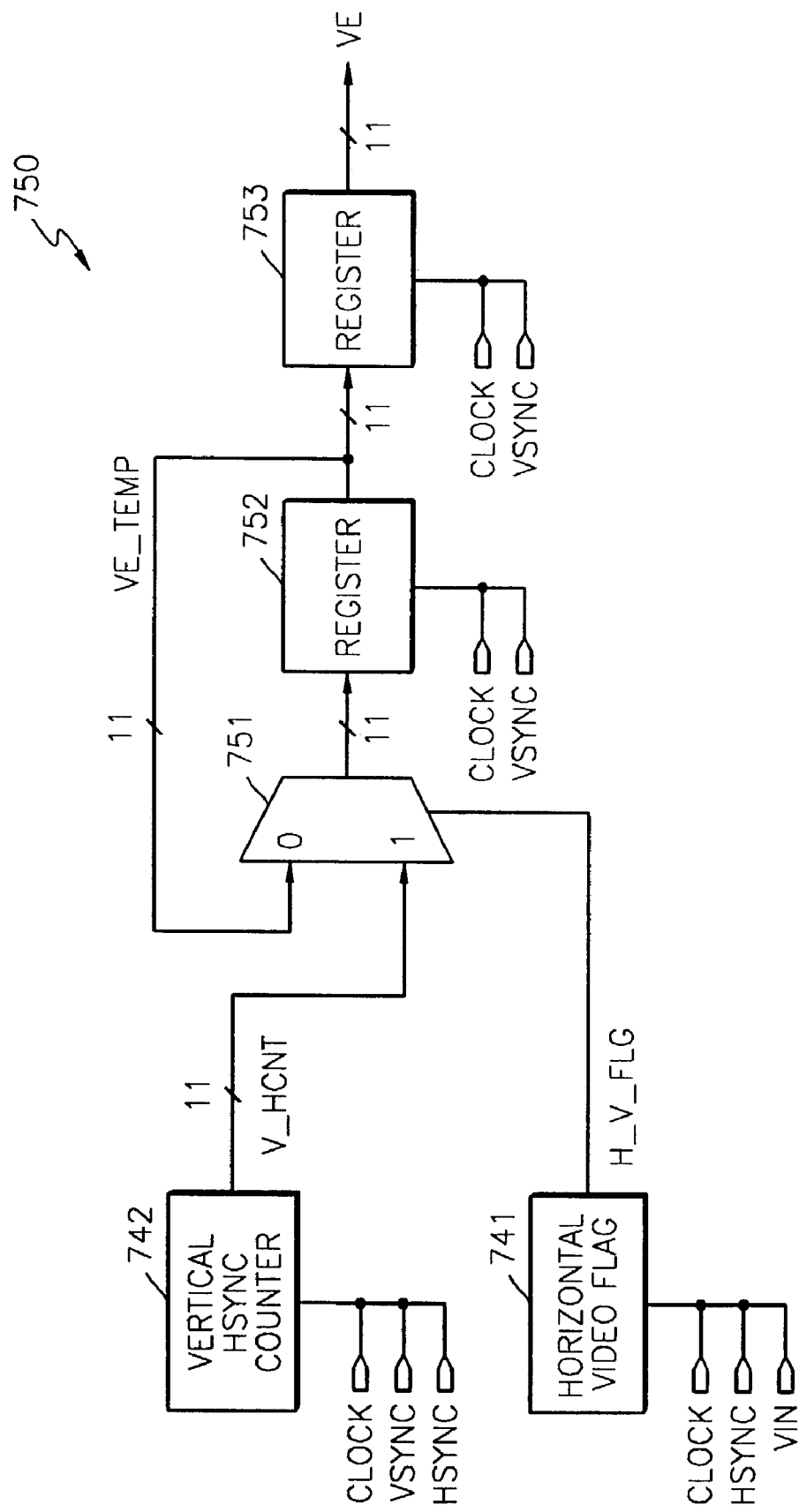
FIG. 16 is a circuit diagram illustrating an example of the vertical ending point detecting unit shown in FIG. 7.

FIG. 16 is a circuit diagram illustrating an example of the vertical ending point detecting unit 750 shown in FIG. 7. The operation of the vertical ending point detecting unit 750 may be performed by the circuit shown in FIG. 16. Referring to FIG. 16, the vertical ending point detecting unit 750 includes a vertical clock counter 742, a horizontal video flag signal generator 741, a multiplexer 751, and registers 752 and 753.

The vertical clock counter 742 counts the horizontal synchronous signal HSYNC which indicates the start of each horizontal line and outputs the vertical line count V_HCNT. The vertical clock counter 742 is reset by the vertical synchronous signal VSYNC when one frame starts.

The horizontal video flag signal generator 741 generates the horizontal video flag signal H_V_FLG which indicates the existence of a video signal in each horizontal line and is reset by the horizontal synchronous signal HSYNC at the initial stage of each horizontal line.

The multiplexer 751 receives the vertical line count V_HCNT and the temporary vertical ending point VE_TEMP and selects and outputs the vertical line count V_HCNT when the horizontal video flag signal H_V_FLG is '1'. The multiplexer 751 selects and outputs the temporary vertical ending point VE_TEMP when the horizontal video flag signal H_V_FLG is '0'.

Thus, when the horizontal video flag signal H_V_FLG is logic high ('1'), the temporary vertical ending point VE_TEMP register 752 which stores the output signal of the multiplexer 751 stores the vertical line count V_HCNT as a new temporary vertical ending point VE_TEMP. When the horizontal video flag signal H_V_FLG is logic low ('0'), the temporary vertical ending point VE_TEMP register 752 maintains the previous value. The temporary vertical ending point register 752 is reset by the vertical synchronous signal VSYNC at the initial stage of each frame.

The vertical ending point register 753 receives the temporary vertical ending point VE_TEMP as the vertical ending point VE when each frame has ended.

By performing the above steps, a minimum value (HS, VS) and a maximum value (HE, VE) in horizontal and vertical directions of the active video area are detected in terms of the count values H_CKCNT and V_HCNT that are synchronized with a system clock signal of the monitor.

In order to readily perform the process of detecting the active video area, the reference pattern is used. Preferably, the reference pattern is a video signal which is embedded only in edges of the active video area so that most video signals of the screen are not affected.

The simplest reference pattern may be a pattern that is embedded in four angular points, or corners, of the active video area.

Preferably, the reference pattern is a signal having a large level, that is, a signal with a sufficient brightness, as compared to the black level BL, so that the comparison signal generator 710 generates logic high without any errors even when the black level BL varies.

Figure 17:
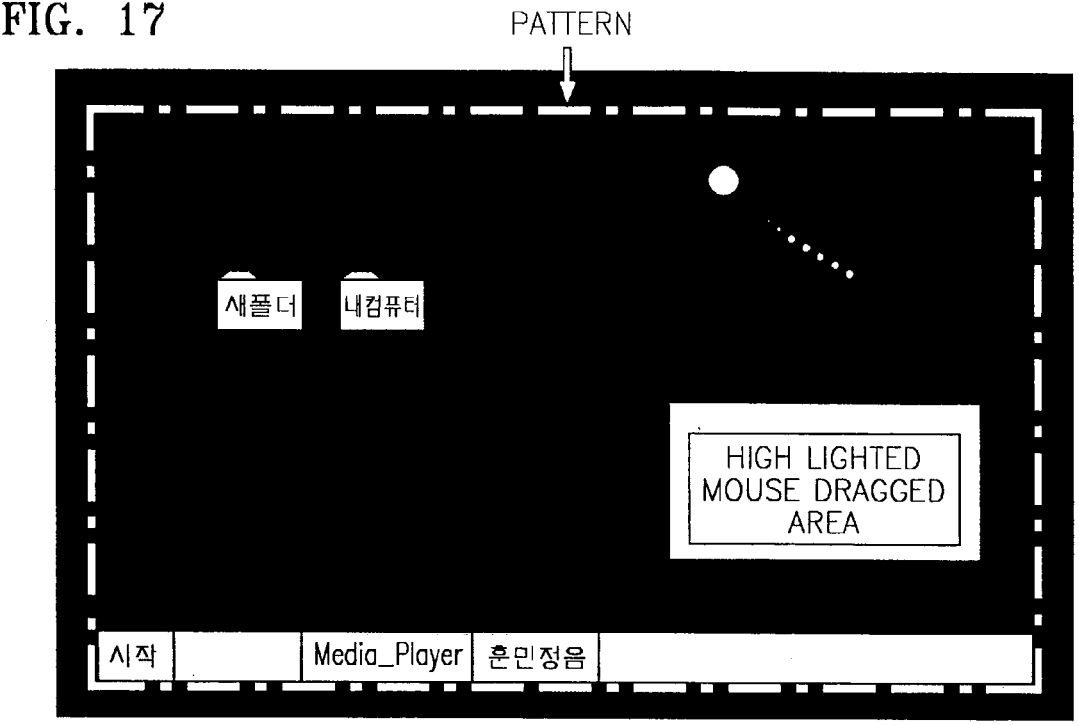
FIGS. 17 through 19 illustrate examples of a reference pattern according to the present invention.
Figure 18:
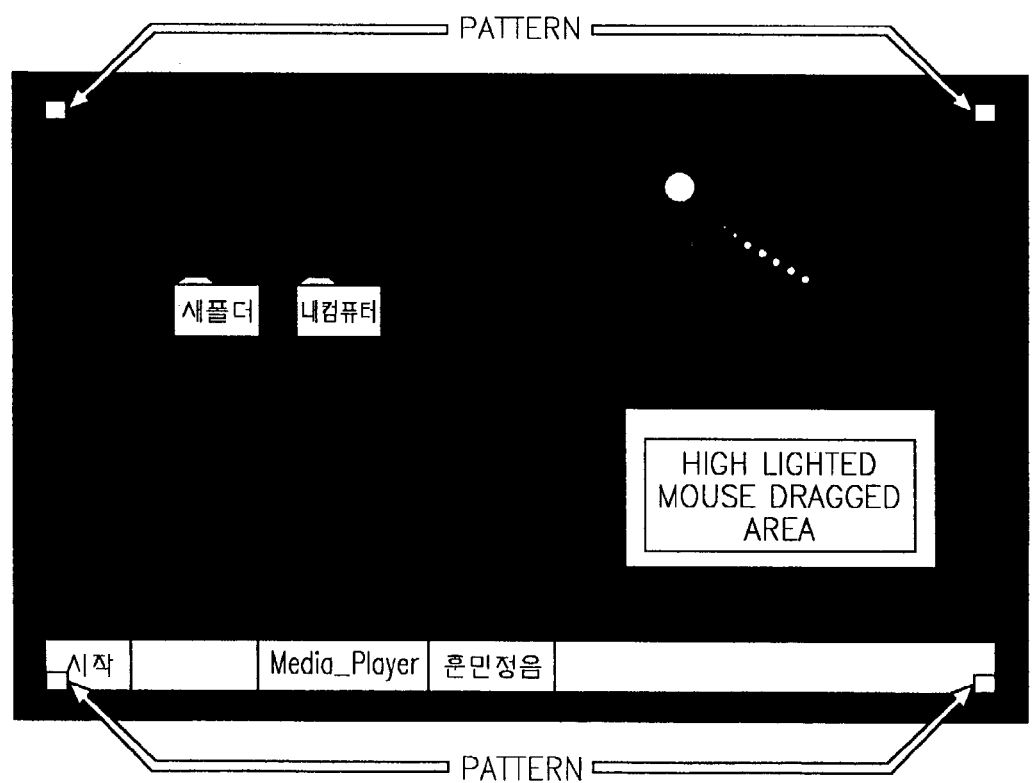
Figure 19:
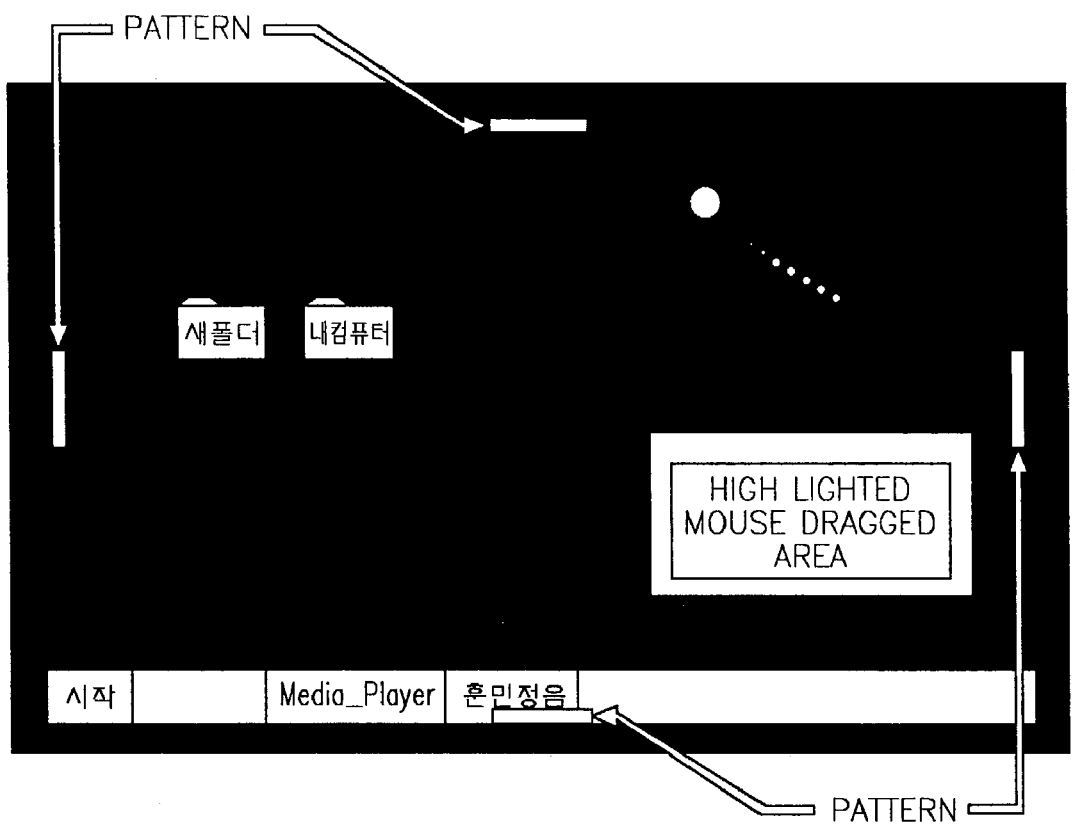

FIGS. 17 through 19 illustrate examples of reference patterns according to the present invention.

Highlighted mouse dragged areas in FIGS. 17 through 19 are areas that are selected using a mouse. When a predetermined area is selected using the mouse, the reference pattern PATTERN is generated for the predetermined amount of time as short as possible so that the detection IC 620 can easily detect the active video area but can not disturb the user's view.

The reference pattern PATTERN shown in FIG. 17 includes signals having a rectangular dotted line which surrounds the edges of the active video area.

The reference pattern PATTERN shown in FIG. 18 includes small white rectangular signals at the four corners of the active video area.

The reference pattern PATTERN shown in FIG. 19 includes white bar-shaped signals in the middle of the four edges of the active video area.

The active video area is clearly detected using the reference pattern PATTERN. As shown in FIGS. 17 through 19, even though a background screen is black and a moving white object exists on the black background screen, the detection IC 620 can clearly detect the active video area using the reference pattern PATTERN which can imply four vertexes of rectangle of the active video area.

Figure 3:
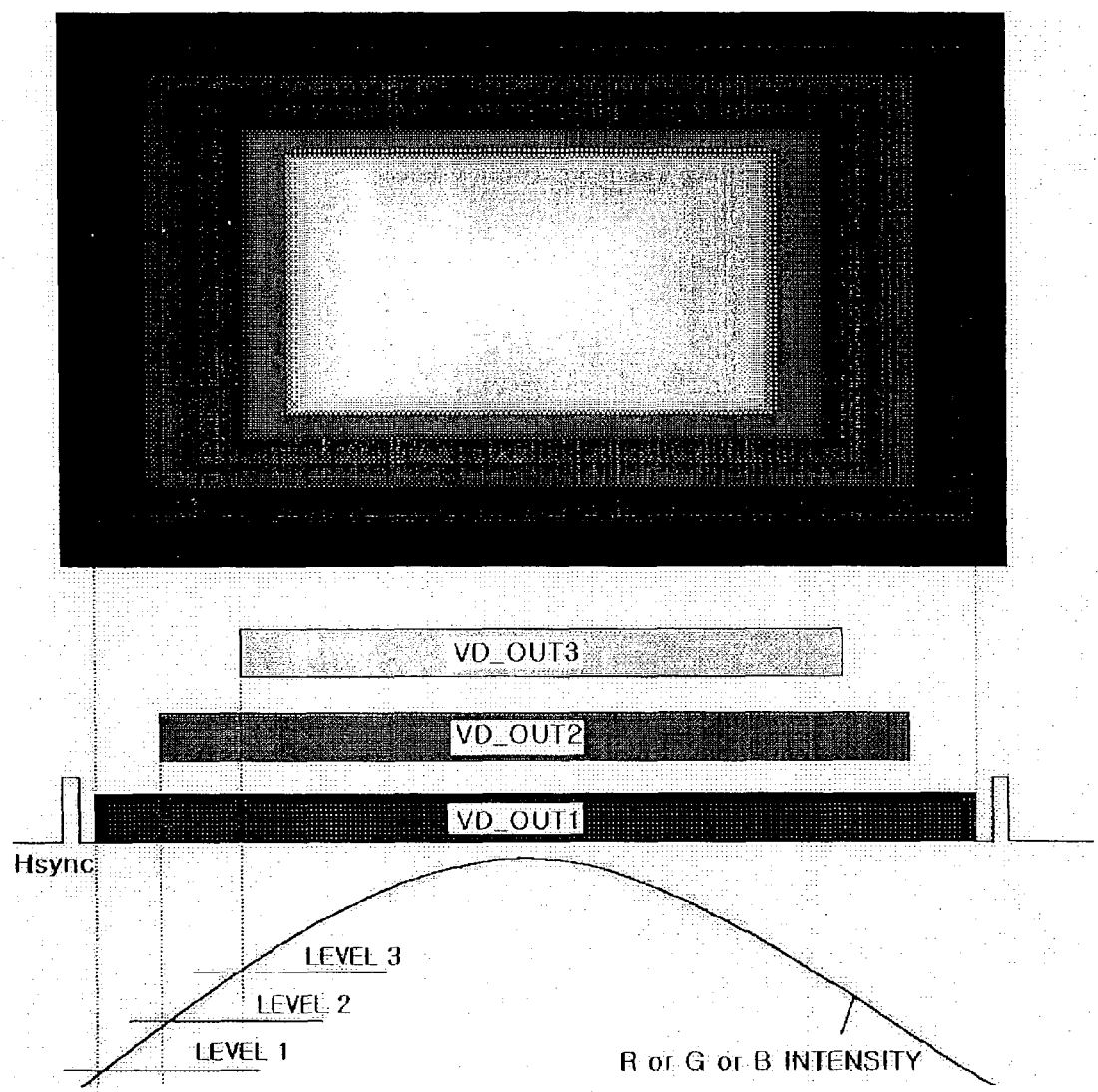
FIG. 3 illustrates the screen of the display device with a brightness gradient.
Figure 4:
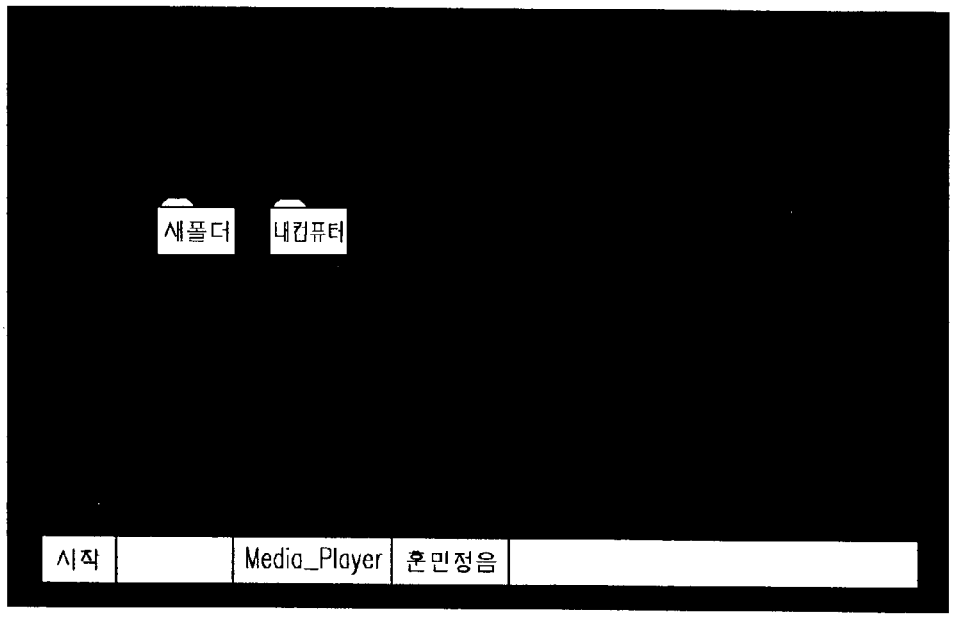
FIGS. 4 and 5 illustrate cases where a background screen of the display device is used to explain the difficulty in recognizing the active video area.
Figure 5:
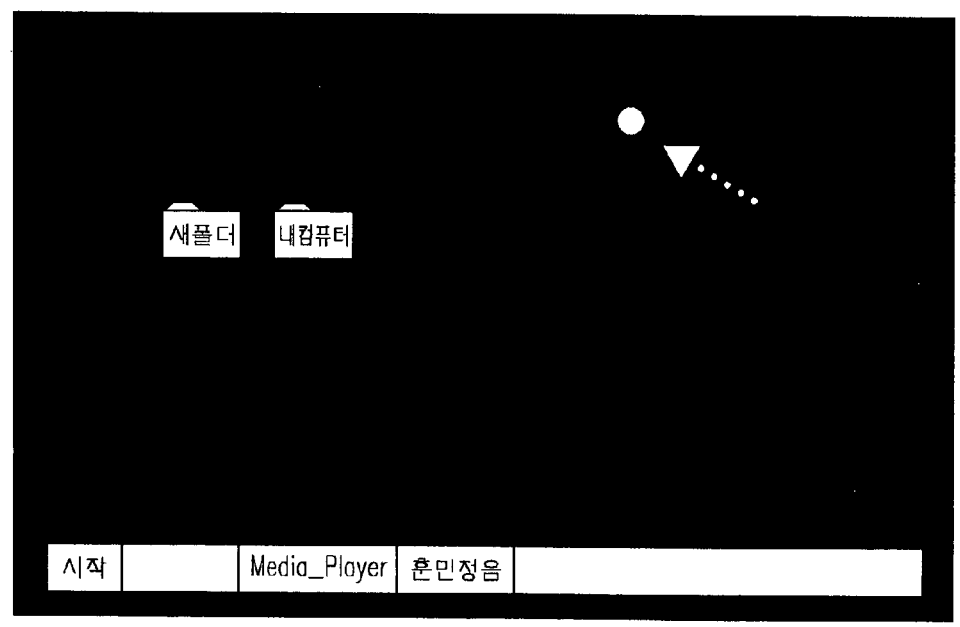
Figure 20:
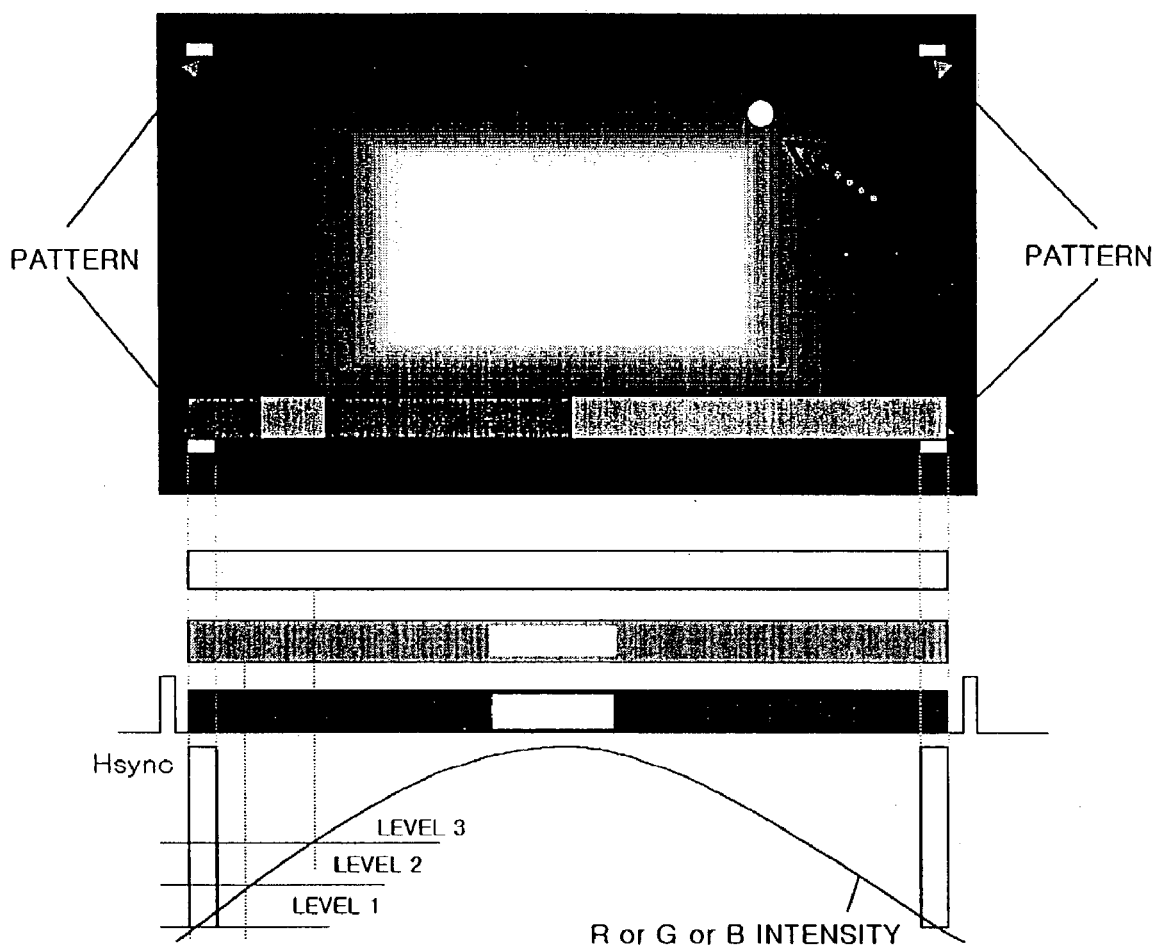
FIG. 20 illustrates a case where the reference pattern is embedded in the screen of the display device with a brightness gradient.

FIG. 20 illustrates a case where the reference pattern is embedded in the screen of the display device along with a video signal of brightness gradient, as shown in FIG. 3.

As shown in FIG. 20, when the reference pattern PATTERN is used in the screen along with a brightness gradient, the detected active video area is constant even though the black level BL varies. For example, even though the black level BL is changed into first, second, and third levels Level 1, Level 2 and Level 3, with variations in temperature and process, an area that is recognized as the video signal, i.e., the active video area, is recognized by the minimum and maximum values of position in vertical and horizontal directions in which the reference pattern exists. Thus, active video areas VD_OUT1, VD_OUT2, and VD_OUT3 that are recognized by the first, second, and third black levels Level 1, Level 2, and Level 3 are substantially the same.

A coordinate mapping method according to an embodiment of the present invention will be described below.

First, a predetermined area of the video source is selected using a pointing device. If the predetermined area is selected, a predetermined reference pattern having the above-mentioned characteristics is generated. R, G, and B signals in which the reference pattern is embedded are transmitted to the display device from the video source. The R, G, and B signals are transmitted to the display device from the video source via a first cable. In this case, the coordinates for selected area in video source, the horizontal length HMAX and the vertical length VMAX of the video source, are transmitted to the display device via a second cable. Preferably, the first cable is a general monitor cable, and the second cable is a universal serial bus (USB) cable.

The R, G, and B signals in which the reference pattern is embedded are compared with a predetermined black level such that the comparison signal which indicates the existence of a video signal is output.

Next, a horizontal starting point, a horizontal ending point, a vertical starting point, and a vertical ending point, which are four coordinates of the active video area, are detected using the comparison signal. The detected horizontal starting point, the detected horizontal ending point, the detected vertical starting point, and the detected vertical ending point are applied, for example, to Equation 1 above, such that the selected predetermined area of the video source is mapped into an area of the display device. A predetermined function is performed in the converted area of the display device.

According to the present invention, the coordinates of the video source are elaborately mapped to the coordinates of the display device. The mapped coordinate information is used by the display device such that the user can select a predetermined area not from the display device directly, but from the coordinate system of the video source using pointing devices and can correctly perform a desired function in the selected area on the display device. In particular, in the case of a video source such as a computer, a video signal has a close relation with a software unit such as an O/S, and thus the position of the display device can be correctly selected and controlled using the software unit.

In addition, the reference pattern is generated and is embedded in the R, G, and B video signals so that the detection circuit embedded in the display device may easily detect the active video area. Hence, the active video area can be correctly detected regardless of the characteristics of the video signal or variations in the black level.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A circuit for detecting an active video area for a display device, the circuit comprising:
    a comparison signal generator which compares continuously received R, G, and B signals with a predetermined black level and outputs a comparison signal which indicates the existence of a video signal;
    a horizontal starting point detecting unit which detects a horizontal starting point, which is a minimum coordinate in a horizontal direction of the display device, in which the comparison signal has a predetermined first logic level;
    a horizontal ending point detecting unit which detects a horizontal ending point, which is a maximum coordinate in the horizontal direction of the display device, in which the comparison signal has the predetermined first logic level;
    a vertical starting point detecting unit which detects a vertical starting point, which is a minimum coordinate in a vertical direction of the display device, in which the comparison signal has the predetermined first logic level; and
    a vertical ending point detecting unit which detects a vertical ending point, which is a maximum coordinate in the vertical direction of the display device, in which the comparison signal has the predetermined first logic level;
    wherein a predetermined reference pattern is embedded in the R, G, and B signals.

2. The circuit of claim 1, wherein the horizontal starting point, the horizontal ending point, the vertical starting point, and the vertical ending point, respectively, are represented as a counter value that is synchronized with a system clock signal of the display device.

3. The circuit of claim 1, wherein the reference pattern includes signals that are placed at a predetermined position on the display device to indicate the active video area.

4. The circuit of claim 3, wherein the predetermined position includes four corners of the active video area.

5. The circuit of claim 1, wherein the pattern signals are signals having a brightness greater than a predetermined black level.

6. The circuit of claim 1, wherein the comparison signal generator comprises:
    an R comparator which compares the R signal with the black level and generates an R output signal having the first logic level when the R signal has a level that is larger than the black level;
    a G comparator which compares the G signal with the black level and generates a G output signal having the first logic level when the G signal has a level that is larger than the black level; and
    a B comparator which compares the B signal with the black level and generates a B output signal having the first logic level when the B signal has a level that is larger than the black level;
    wherein the comparison signal having the first logic level is generated when at least one of the R output signal, the G output signal, and the B output signal has the first logic level.

7. A method for detecting an active video area for a display device, the method comprising:
    (a) comparing continuously received R, G, and B signals with a predetermined black level and outputting a comparison signal which indicates the existence of a video signal;
    (b) detecting a horizontal starting point, which is a minimum coordinate in a horizontal direction of the display device, in which the comparison signal has a predetermined first logic level;
    (c) detecting a horizontal ending point, which is a maximum coordinate in the horizontal direction of the display device, in which the comparison signal has the predetermined first logic level;

(d) detecting a vertical starting point, which is a minimum coordinate in a vertical direction of the display device, in which the comparison signal has the predetermined first logic level; and
(e) detecting a vertical ending point, which is a maximum coordinate in the vertical direction of the display device, in which the comparison signal has the predetermined first logic level;
wherein a predetermined reference pattern is embedded in the R, G, and B signals.

8. The method of claim 7, wherein the horizontal starting point, the horizontal ending point, the vertical starting point, and the vertical ending point, respectively, are represented as a counter value that is synchronized with the system clock signal of the display device.

9. The method of claim 7, wherein the reference pattern includes signals that are placed at a predetermined position on the display device to indicate the active video area.

10. The method of claim 9, wherein the predetermined position includes four corners of the active video area.

11. The method of claim 7, wherein the pattern signals are signals having greater brightness than a predetermined black level.

12. The method of claim 7, wherein step (a) comprises:
(a1) comparing the R signal with the black level and generating an R output signal having the first logic level when the R signal has a level that is larger than the black level;
(a2) comparing the G signal with the black level and generating a G output signal having the first logic level when the G signal has a level that is larger than the black level;
(a3) comparing the B signal with the black level and generating a B output signal having the first logic level when the B signal has a level that is larger than the black level; and
(a4) generating the comparison signal having the first logic level when at least one of the R output signal, the G output signal, and the B output signal has the first logic level.

13. The method of claim 7, wherein step (b) comprises:
(b1) setting a horizontal clock count, a vertical line count, and a temporary horizontal starting point to predetermined values;
(b2) determining whether the comparison signal has the first logic level;
(b3) comparing the temporary horizontal starting point with the horizontal clock count when the comparison signal has the first logic level;
(b4) updating the temporary horizontal starting point to the horizontal clock count when the horizontal clock count is smaller than the temporary horizontal starting point as the result of comparison in step (b3); (b5) increasing the horizontal clock count by 1 and repeatedly performing steps (b2) through (b4) until the horizontal clock count reaches a predetermined horizontal maximum value;
(b6) resetting the horizontal clock count and increasing the vertical line count by 1 when the horizontal clock count reaches the horizontal maximum value; and
(b7) repeatedly performing steps (b2) through (b6) until the vertical line count reaches a predetermined vertical maximum value;
wherein the horizontal starting point is set to the temporary horizontal starting point when the vertical line count reaches the vertical maximum value.

14. The method of claim 7, wherein step (c) comprises:
(c1) setting a horizontal clock count, a vertical line count, and a temporary horizontal ending point to predetermined values;
(c2) determining whether the comparison signal has the first logic level;
(c3) comparing the temporary horizontal ending point with the horizontal clock count when the comparison signal has the first logic level;
(c4) updating the temporary horizontal ending point to the horizontal clock count when the horizontal clock count is larger than the temporary horizontal ending point as a result of comparison in step (c3);
(c5) increasing the horizontal clock count by 1 and repeatedly performing steps (c2) through (c4) until the horizontal clock count reaches a predetermined horizontal maximum value;
(c6) resetting the horizontal clock count and increasing the vertical line count by 1 when the horizontal clock count reaches the horizontal maximum value; and
(c7) repeatedly performing steps (c2) through (c6) until the vertical line count reaches a predetermined vertical maximum value;
wherein the horizontal ending point is set to the temporary horizontal ending point when the vertical line count reaches the vertical maximum value.

15. The method of claim 7, wherein step (d) comprises:
(d1) setting a vertical line count and a temporary vertical starting point to predetermined values;
(d2) determining whether a horizontal video flag signal has the first logic level and the temporary vertical starting point is the predetermined value; and
(d3) updating the temporary vertical starting point to the vertical line count when the horizontal video flag signal has the first logic level and the temporary vertical starting point is the predetermined value as a result of comparison in step (d2);
wherein the horizontal video flag signal has the first logic level during one period of horizontal line when the comparison signal having the first logic level exists in the corresponding horizontal line, and the vertical starting point is set to the temporary vertical starting point when a frame has ended.

16. The method of claim 7, wherein step (e) comprises:
(e1) setting a vertical line count and a temporary vertical ending point to predetermined values;
(e2) determining whether a horizontal video flag signal has the first logic level;
(e3) updating the temporary vertical ending point to the vertical line count when the horizontal video flag signal has the first logic level as a result of comparison in step (e2);
(e4) increasing the vertical line count by 1; and
(e5) repeatedly performing steps (e2) through (e4) until a frame has ended;
wherein the horizontal video flag signal has the first logic level during one period of horizontal line when the comparison signal having the first logic level exists in the corresponding horizontal line, and the vertical ending point is set to the temporary vertical ending point when the frame has ended.

17. A method for mapping coordinates of a video source to coordinates of a display device, the method comprising:
(a) selecting a predetermined area of the video source;
(b) generating a predetermined reference pattern;
(c) transmitting R, G, and B signals in which the reference pattern is embedded, to the display device;

(d) comparing the R, G, and B signals with a predetermined black level and outputting a comparison signal which indicates the existence of a video signal;

(e) detecting a horizontal starting point, a horizontal ending point, a vertical starting point, and a vertical ending point using the comparison signal; and (f) converting the selected predetermined area of the video source into an area of the display device, according to a predetermined mapping relationship and the detected horizontal starting point, the detected horizontal ending point, the detected vertical starting point, and the detected vertical ending point.

18. The method of claim 17, further comprising (g) performing a predetermined function in the converted area of the display device.

19. The method of claim 17, wherein step (a) is performed using a pointing device.

20. A display device for receiving a video signal from a video source and displaying the video signal, the device comprising:

a detection circuit which receives R, G, and B signals, in which a predetermined reference pattern is embedded, and detects an active video area by comparing the R, G, and B signals with a predetermined black level and generating a comparison signal indicating the existence of a video signal and determining the active video area by detecting a horizontal starting point, a horizontal ending point, a vertical starting point and a vertical ending point using the comparison signal;

a micro-controller (MCU) which converts a selected area of the video source into the counterpart area of the display device using coordinate information of the selected area of the video source and the active video area of the display device; and a function control circuit which receives information on the converted area of the display device and performs a predetermined function in the converted area of the display device.

21. The device of claim 20, wherein the detection circuit comprises:

a comparison signal generator which compares the R, G, and B signals with the predetermined black level and outputs the comparison signal which indicates the existence of a video signal;

a horizontal starting point detecting unit which detects the horizontal starting point, which is a minimum coordinate in a horizontal direction of the display device, in which the comparison signal has a predetermined first logic level;

a horizontal ending point detecting unit which detects the horizontal ending point, which is a maximum coordinate in the horizontal direction of the display device, in which the comparison signal has the predetermined first logic level;

a vertical starting point detecting unit which detects the vertical starting point, which is a minimum coordinate in a vertical direction of the display device, in which the comparison signal has the predetermined first logic level; and a vertical ending point detecting unit which detects the vertical ending point, which is a maximum coordinate in the vertical direction of the display device, in which the comparison signal has the predetermined first logic level.

22. The device of claim 20, wherein the reference pattern includes signals that are placed at a predetermined position on the display device to indicate the active video area.

23. The device of claim 22, wherein the predetermined position includes four corners of the active video area.

24. The device of claim 20, wherein the reference pattern signals are signals with greater brightness than the predetermined black level.

25. The device of claim 20, wherein the R, G, and B signals are transmitted from the video source to the screen of the display device and the detection circuit via a first cable, and the coordinate information of the selected area of the video source is transmitted from the video source to the MCU of the display device via a second cable.

26. A display device for receiving a video signal from a video source and displaying the video signal, the device comprising:

a detection circuit which receives R, G, and B signals, in which a predetermined reference pattern is embedded, and detects an active video area;

a micro-controller (MCU) which converts a selected area of the video source into the counterpart area of the display device using coordinate information of the selected area of the video source and the active video area of the display device; and a function control circuit which receives information on the converted area of the display device and performs a predetermined function in the converted area of the display device;

wherein the detection circuit comprises:

a comparison signal generator which compares the R, G, and B signals with a predetermined black level and outputs a comparison signal which indicates the existence of a video signal;

a horizontal starting point detecting unit which detects a horizontal starting point, which is a minimum coordinate in a horizontal direction of the display device, in which the comparison signal has a predetermined first logic level;

a horizontal ending point detecting unit which detects a horizontal ending point, which is a maximum coordinate in the horizontal direction of the display device, in which the comparison signal has the predetermined first logic level;

a vertical starting point detecting unit which detects a vertical starting point, which is a minimum coordinate in a vertical direction of the display device, in which the comparison signal has the predetermined first logic level; and a vertical ending point detecting unit which detects a vertical ending point, which is a maximum coordinate in the vertical direction of the display device, in which the comparison signal has the predetermined first logic level.

* * * * *